(12) United States Patent
Huang et al.

(10) Patent No.: US 7,031,574 B2
(45) Date of Patent: Apr. 18, 2006

(54) PLUG-IN MODULE FOR PROVIDING BI-DIRECTIONAL DATA TRANSMISSION

(75) Inventors: Yonglin Huang, Milpitas, CA (US); Qi Deng, Cupertino, CA (US); Robert Huang, Fremont, CA (US); Liren Du, San Jose, CA (US); Steve Wang, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 90 days.

(21) Appl. No.: 10/624,128

(22) Filed: Jul. 21, 2003

(65) Prior Publication Data

US 2005/0018967 A1    Jan. 27, 2005

Related U.S. Application Data

(63) Continuation-in-part of application No. 10/617,006, filed on Jul. 10, 2003.

(60) Provisional application No. 60/397,969, filed on Jul. 23, 2002, provisional application No. 60/397,971, filed on Jul. 23, 2002, provisional application No. 60/397,967, filed on Jul. 23, 2002, provisional application No. 60/398,056, filed on Jul. 23, 2002, provisional application No. 60/397,851, filed on Jul. 23, 2002, provisional application No. 60/397,728, filed on Jul. 23, 2002, provisional application No. 60/397,970, filed on Jul. 23, 2002, provisional application No. 60/397,852, filed on Jul. 23, 2002, provisional application No. 60/397,963, filed on Jul. 23, 2002, provisional application No. 60/395,413, filed on Jul. 13, 2002, provisional application No. 60/394,774, filed on Jul. 10, 2002.

(51) Int. Cl.
 *G02B 6/26* (2006.01)

(52) U.S. Cl. .............................. 385/39; 385/21; 385/52
(58) Field of Classification Search ............ 385/20–24, 385/31, 39, 53–94
See application file for complete search history.

(56) References Cited

U.S. PATENT DOCUMENTS

| | | | |
|---|---|---|---|
| 4,650,289 A | 3/1987 | Kuwahara | |
| 4,911,765 A | 3/1990 | Song et al. | |
| 5,642,448 A | 6/1997 | Pan et al. | |
| 6,049,426 A | 4/2000 | Xie et al. | |
| 6,115,516 A * | 9/2000 | Watson et al. | 385/24 |
| 6,178,044 B1 | 1/2001 | Li et al. | |
| 6,282,025 B1 | 8/2001 | Huang et al. | |
| 6,339,661 B1 | 1/2002 | Kokkelink et al. | |
| 6,407,961 B1 | 6/2002 | Perets et al. | |
| 6,493,141 B1 | 12/2002 | Cao et al. | |
| 6,597,479 B1 * | 7/2003 | Chu et al. | 398/41 |
| 6,636,651 B1 | 10/2003 | Li | |
| 6,795,242 B1 | 9/2004 | Pan et al. | |
| 6,836,575 B1 * | 12/2004 | Li | 385/11 |
| 2002/0126945 A1 | 9/2002 | Konishi et al. | |
| 2002/0168128 A1 | 11/2002 | Chang et al. | |
| 2004/0013368 A1 * | 1/2004 | Gilliland et al. | 385/53 |

OTHER PUBLICATIONS

*Optics*, Eugene Hecht, Figure 8.52, p. 306.

* cited by examiner

*Primary Examiner*—Sung Pak
(74) *Attorney, Agent, or Firm*—Workman Nydegger

(57) ABSTRACT

A plug in communications module for achieving bi-directional communication along a single fiber-optic cable in a fiber-optic network. The plug in module is made such that it plugs directly into fiber-optic communication equipment of standard form factors. Bi-directional communication is achieved by using a low-cost circulator. The plug in module also has a receptacle that is used for attaching a patch cable between the fiber-optic network in the plug in module.

30 Claims, 11 Drawing Sheets

OPTICAL AXIS 0°

OPTICAL AXIS 45°

PLUG-IN MODULE FOR PROVIDING BI-DIRECTIONAL DATA TRANSMISSION

CROSS-REFERENCE TO RELATED APPLICATIONS

This application is a continuation-in-part application of U.S. patent application Ser. No. 10/617,006, which was filed on Jul. 10, 2003 and entitled "Single-Fiber Bi-Directional Transceiver", which claims priority to and the benefit of U.S. Provisional Patent Applications No. 60/394,774, filed Jul. 10, 2002 and entitled "Single-Fiber Bi-Directional Transceiver"; Ser. No. 60/397,969, filed Jul. 23, 2002, entitled "Plug-in Module Having a Receptacle for Receiving Bi-Directional Data Transmission"; Ser. No. 60/397,971, filed Jul. 23, 2002; entitled "Plug-in Module Having a Receptacle for Receiving Bi-Directional Data Transmission"; Ser. No. 60/397,967, filed Jul. 23, 2002, entitled "Optical Circulator Using a Prism for Bi-Directional Communication"; Ser. No. 60/398,056, filed Jul. 23, 2002, entitled "Low Cost Optical Circulator for Bi-Directional Communication"; Ser. No. 60/397,851, filed Jul. 23, 2002, entitled "Optical Circulator with Dual Receive Path for Bi-Directional Communication"; Ser. No. 60/397,728, filed Jul. 23, 2002, entitled "Optical Circulator with Dual Receive Path and Quarter Wave-Plate for Bi-Directional Communication"; Ser. No. 60/397,970, filed Jul. 23, 2002, entitled "Optical Circulator with Adjacent Transmit and Receive Ports for Bi-Directional Communication"; Ser. No. 60/397,852, filed Jul. 23, 2002, entitled "Optical Circulator with Beam Displaces for Bi-Directional Communication"; Ser. No. 60/397,963, filed Jul. 23, 2002, entitled "Optical Circulator with Dual Beam Displacers for Bi-Directional Communication"; and Ser. No. 60/395,413, filed Jul. 13, 2002, entitled "Optical Pump Module"; all of which are hereby incorporated by reference in their entireties.

BACKGROUND OF THE INVENTION

1. The Field of the Invention

The invention generally relates to the field of communication along a fiber optic channel. More specifically, the invention relates to an integrated device for accomplishing bi-direction data transmission along a single fiber optic cable where the integrated device is configured to plug into a standard connector on a communications panel.

2. The Relevant Technology

In the field of data transmission, one method of efficiently transporting data is through the use of fiber optics. Digital data is propagated through a fiber optic cable using light emitting diodes or lasers. Light signals allow for extremely high transmission rates and very high bandwidth capabilities. Also, light signals are resistant to electro-magnetic interferences that would otherwise interfere with electrical signals. Light signals are more secure because they do not allow portions of the signal to escape from the fiber optic cable as can occur with electrical signals in wire-based systems. Light also can be conducted over greater distances without the signal loss typically associated with electrical signals on copper wire.

One method of achieving bi-directional communication is through the use of two fiber optic cables. A first cable can be used to transmit data from a communications device and the second cable used for receiving data. It is often desirable to limit the number of fiber optic cables between two communication points to save on material costs and installation. One method of limiting the number of cables is by both sending and receiving data on the same fiber optic cable, which is possible because of the directional nature of an optical signal that is propagated along a fiber optic cable. Generally, achieving bi-directional communication on a single fiber optic cable is done through the use of circulators or splitters.

A common splitter design is shown in FIG. 1. Splitter 100 includes input ports and output ports. As shown in FIG. 1, these ports are represented by pigtail leads. Pigtail 102 represents the transmission line of a communications transceiver. Pigtail 104 represents the receive line of the communications transceiver. Pigtail 106 is a fiber optic cable to the communications network. Commonly, a transceiver sends optical signals through the transmission pigtail 102. The optical signal travels to a splitter plate 108, which splits the optical signal in two directions. In one example, approximately half of the optical signal is sent towards the decimation path 112a. The remaining portion of the optical signal is propagated into the pigtail 106. Data being received by the splitter 100 travels through the pigtail 106 into the splitter 100. The splitter plate 108 reflects half of the light to the decimation path 112a and half of the light to the reflector 110. The reflector 110 reflects all of the light towards the reception pigtail 104. Any light reflected to the decimation path 112a is wasted. A 3 dB decimation represents approximately a half power drop at the splitter plate 108. Examining FIG. 1, it can be seen that that at least 3 dB, or about 50% of the initial power, is lost using the splitter method of bi-directional communication at each terminal. For a transceiver pair, the total loss of using this splitter is approximately 6 dB.

Another method of bi-directional communication along a single fiber optic cable involves the use of optical circulators. An optical circulator, is generally a device having three or more ports, by which an optical signal input into one port is output at the next port in either a clockwise or a counterclockwise direction. For example, an optical signal input at port A of optical circulator exits at port B. An optical signal input at port B exits at port C. In a three-port device, an optical signal input at port C exits at port A. The drawback of using currently available circulators for this type of communication is that currently available circulators are expensive to implement.

The third conventional method of bi-directional communication along a single fiber-optic cable involves the use of lasers with different wavelengths. Commonly a 1550 nanometer distributed feedback (DFB) laser is used to propagate an optical signal in one direction and a 1310 nanometer vertical cavity surface emitting laser (VCSEL) is used to propagate the optical signal in the opposite direction. One drawback with this configuration is that it requires two types of transceivers that are complementary, with different transceivers being used at the two communications devices that are engaging in the bi-directional communication. For example, one of the two communications devices must have a transceiver with a 1550 nanometer transmitter and a 1310 nanometer receiver. In contrast, the other of the two communications devices must have a complementary transceiver having a 1310 nanometer transmitter and a 1550 nanometer receiver. Requiring two types of transceivers increases production and maintenance costs. It would therefore be beneficial to create a device in which all transceivers could be the same. A second drawback of this type of approach to bi-directional communication is that the 1550 nanometer DFB laser is very expensive as compared to the 1310 nanometer VCSEL. Therefore it would be beneficial to use only the cheaper 1310 nanometer VCSEL.

BRIEF SUMMARY OF THE INVENTION

What is needed in the art is a single, integrated device which overcomes the limitations of currently available technology. The device allows for easy connection to currently available patch panels which use both an input network fiber and an output network fiber. The device incorporates a low cost optical circulator to allow for receiving and transmitting network optical signals on a single fiber optic cable. Additionally, the device allows the use of a single frequency transmitter and receiver, thus eliminating the need for both a DFB laser and a VCSEL.

The present invention uses a low cost optical circulator packaged in a compact bi-directional communications module configured to couple to standard communications network components, such as a communications panel and/or a patch panel. The module includes a module casing within which is disposed an optical circulator. The optical circulator has a first port through which optical data is transmitted, a second port through which optical data is received, and a third port through which optical data is both transmitted and received.

Optically communicating with the first port and second port of the circulator is a duplex connector. This connector has a first connector that is adapted to optically communicate with the first port and a second connector that is adapted to optically communicate with the second port. The module further includes a means for optically communicating the third port with the patch panel to enable bi-directional communication of optical data.

This means for optically communicating can include a receptacle adapted to receive a pigtail lead. In another configuration, the means for optically communicating includes a pigtail lead integrally formed with the communications module. In still another configuration, the means for optically communicating may include a pigtail that is removably attached or coupled to the module casing. By so doing, the module provides structures that enable bi-directional communication along a single optical fiber rather than typical bi-directional communication using two separate optical fibers.

The optical circulator may have numerous configuration such as those described herein. The optical circulator may includes optical wedges, Faraday rotators, beam splitters, wave plates, beam shifters, or other optical components to change a polarization of the optical signal and hence direct a transmit signal input into a first port of the circulator to a third port of the circulator and direct a receive signal input into the third port to a second port of the circulator.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the drawings to describe the invention. It is to be understood that the drawings are diagrammatic and schematic representations of presently preferred embodiments, and are not limiting of the present invention, nor are they necessarily drawn to scale.

The disclosed device is a plug-in module that converts two fiber bi-directional electromagnetic wave transmissions, such as light transmissions, into single fiber bi-directional transmissions. The module can be selectively installed into a communications device that includes a duplex connector for bi-directional two-fiber transmission. The output of the device that interfaces with the optical network is a receptacle that can be selectively coupled to a patch panel through a patch cord that is configured to carry bi-directional light data. The patch panel in turn couples the patch cord to an optical transmission line in the optical network.

The duplex-communication across a single connector is accomplished by using a modified circulator, various examples and embodiments of which are disclosed herein. Because of the low loss characteristics of a circulator, a 1310 nanometer vertical cavity surface emitting laser (VCSEL) may be used to generate the light pulses that represent the optical data. This is an advantage over what has previously been done, as the losses generated in some other types of bi-directional communication devices have required the use of more expensive lasers such as a 1550 nanometer distributed feedback (DFB) laser.

Figure 1:
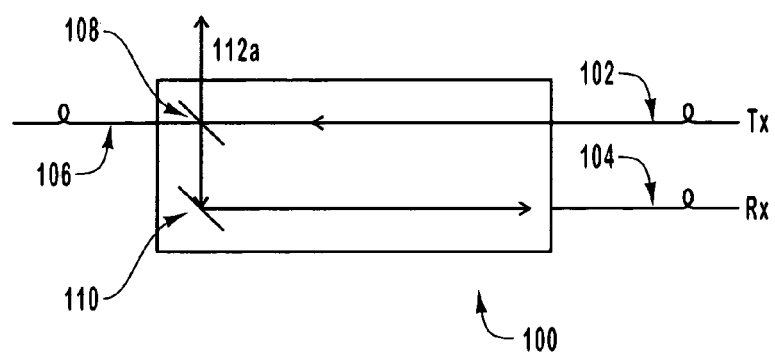
FIG. 1 is a schematic representation of a splitter commonly used in bi-directional communication.
Figure 2:
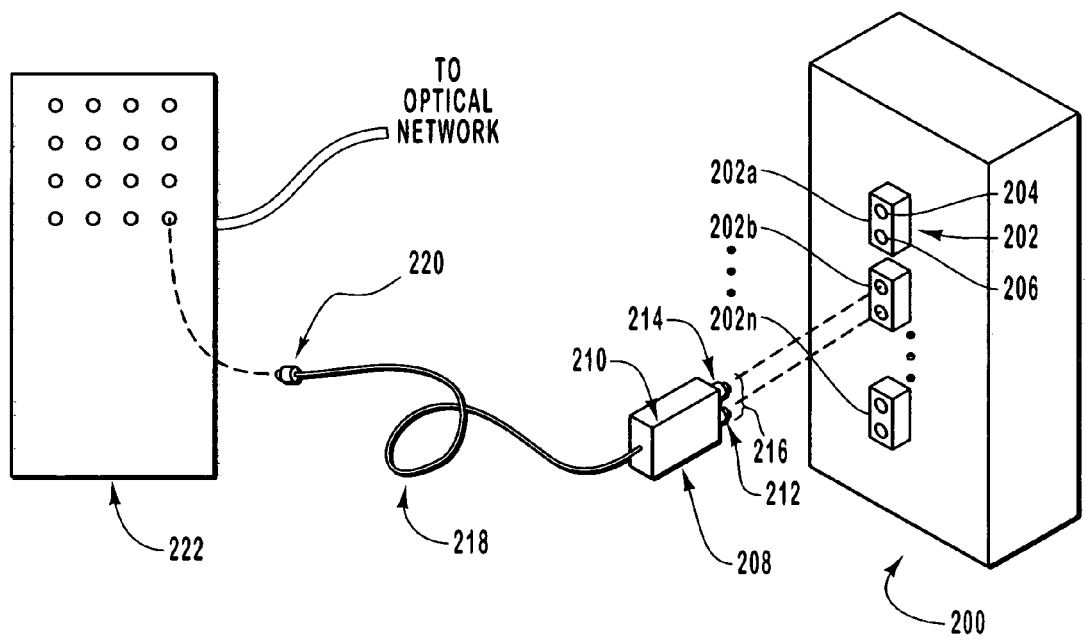
FIG. 2 is an overview drawing of a plug-in module having a pigtail as used in a bi-directional application.

A communications system utilizing the communications module of the present invention is shown in FIG. 2. FIG. 2 shows a communication panel 200 used to manage optical communications in an optical network (not shown). The communication panel 200 includes one or more bi-directional or duplex communication connectors 202a–202n that are associated with optical transceivers (not shown) that have an optical transmitter and an optical receiver. Duplex connectors 202a–202n are generally a matched connecter set, where one port is used as the transmission port of the optical transceiver, and the other port is the receive port of the optical transceiver. For instance, each duplex connector 202a–202n includes a transmit node 204 and a receive node 206 that are associated, respectively, with a transmitter and a receiver of the transceiver. In existing systems, transmit node 204 and receive node 206 operate with separate optical fibers to provide bi-directional communication, i.e., using two optical fibers to enable bi-directional communication. The duplex connector 202a–202n eliminates the need for use of two optical fibers and enables bi-directional communication using a single optical fiber. In addition, duplex connectors 202a–202n can be implemented in a standards-based pluggable transceiver module that has a standardized form and architecture and engages with a standardized port in communication panel 200.

Each connector 202 may receive:a bi-directional communications module 208. The bi-directional communications module 208 includes a module casing 210 configured to house or provide attachment points for other components included in the communications module 208. The bi-directional communications module 208 further includes a duplex connector 216 disposed on module casing 210 that includes male connectors 212, 214 configured to mate with transmit node 204 and receive node 206 of duplex connector 202a–202n. The bi-directional communications module 208 also includes a pigtail lead 218 having a patch panel connector 220 disposed thereupon. The pigtail lead 218 is fixably or releasably connected to bi-direction communications module 208. By including patch panel connector 220, pigtail lead 218 can be coupled to a patch panel 222 that provides access to the optical network. In one embodiment, optical data is transmitted by communication panel 200 through transmit node 204. The optical data enters bi-directional module 208 through first male connector 214. As described herein below, a circulator internal to bi-directional module 208 causes the optical data to leave bi-directional module 208 through pigtail lead 218. The optical data is then transmitted to the optical network through patch panel 222.

Simultaneously data to be received by communication panel 200 is transmitted through the optical network to patch panel 222. The patch panel 222 transmits the data through pigtail lead 218, and to the circulator internal to bi-directional module 208. As described herein below, the internal circulator transmits the optical data to second male connector 212 and so to receive node 206 of communication panel 200.

Thus, the bi-directional module 208 is used to adapt bi-directional duplex connectors 202a–202n for use with bi-directional communication over a single optical fiber instead of the two optical fibers that have been conventionally used. Moreover, because bi-directional module 208 is a plug-in component, bi-directional module 208 can be used with conventional or legacy transceivers that were originally designed for bi-directional communication over a pair of optical fibers. Thus, existing transceivers, such as those that are constructed according to standards-based specifications, can be used with bi-directional communication over single optical fibers, which has the effect of as much as doubling the data transmission capacity of an optical network that is associated with patch panel 222 and has a fixed number of optical transmission lines.

Substantially any circulator design may be used that outputs electromagnetic wave signals, such as light signals, input from port 1 at port 2 and light input from port 2 at port 3. In other words, the circulator need not be able to accept light input at port 3. The circulators described herein utilize input light from port 1 that is linearly polarized and the polarization direction to be aligned with the optical axis of a circulator core of the circulator, as will be described in greater detail hereinafter.

Figure 3:
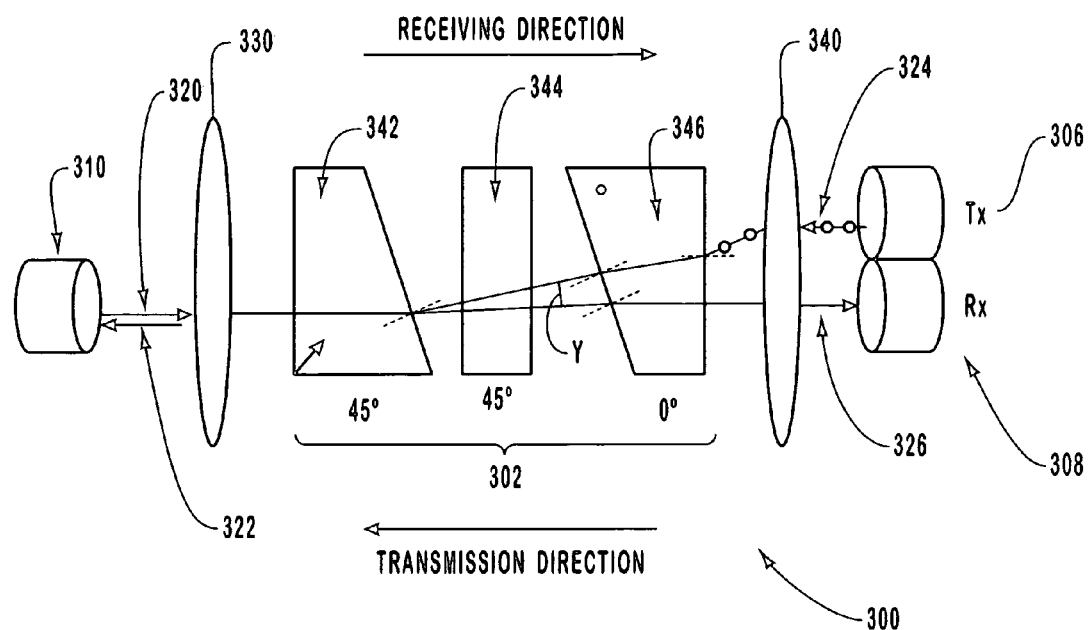
FIG. 3 is a schematic representation of a portion of a plug-in module according to one aspect of the present invention.

An exemplary circulator is depicted in FIG. 3. Referring to FIG. 3, shown is one version of a circulator 300 which functions to provide bi-directional duplex communication within a plug-in module according to one aspect of the present invention. The circulator 300 includes an optical core 302 that optically communicates with a transmit fiber 306, a receive fiber 308, and a network fiber 310 by way of lenses 330 and 340. The transmit fiber 306, which is polarization maintaining (PM), and receiver fiber 308 optically couple to the transceiver end of optical core 302, while network fiber 310 optically couples to the network end of optical core 302.

The network fiber 310, transmit fiber 306, and receive fiber 308 may also have connectors attached to their free ends. In one embodiment, the connectors are of a standard form factor such that they can be coupled to existing fiber optic networks. The network fiber 310 may be a pigtail fiber with a connector at the free end, or alternatively a receptacle for receiving a standard form factor pigtail. The transmit connector and receive connector may be arranged so that they plug directly into a standard form factor transceiver according to one aspect of the present invention.

Light from transmit fiber 306 is transmitted with a well-maintained state of polarization to pass through optical core 302 and to be output to network fiber 310. The network fiber 310 is adapted to propagate bi-directional communication signals so that simultaneously, light from the optical network is transmitted from network fiber 310 with any state of polarization through optical core 302 where it is output at receive fiber 308.

The circulator 300 uses, as optical core 302, two optical birefringent wedges 342 and 346 and a Faraday rotator 344 disposed between the two optical birefringent wedges 342 and 346. Wedge 342, in one configuration, may have an optical axis of 0°, while wedge 346 may have an optical axis of 45°. In this configuration, wedges 342 and 346 collectively function as a Rochon prism to polarize light passing therethrough. Although reference is made to this particular configuration, one skilled in the art will understand that various other devices could be used, such as, but not limited to, Wollaston prisms, Glean-Thompson prisms, Glean-Taylor prisms, or even thin film cubes, to accomplish the circulator function.

To cause optical circulator 300 to be optically non-reciprocal, Faraday rotator 344 is inserted in between the two wedges 342 and 346. This rotator 344 rotates the polarization plane of an input optical signal based on the initial polarization orientation of the input beam. This rotator 344 may be in contact with at least one surface of each wedge 342 and 346. Alternatively, rotator 344 may be separated from each wedge 342 and 346, thereby creating air gaps between rotator 344 and wedges 342 and 346. Rotator 344 may be fabricated from a magneto-optic material, such as a YIG crystal, or other materials that provide the optical properties or characteristics associated with rotator 344.

In addition, rotator 344 may utilize a latching magnetic material or a non-latching magnetic material. For non-latching material, an external magnet may be used to apply a magnetic field, while a rotator fabricated from a latching material does not need an external magnetic field. In one example, when circulator 300 is intended to be used in an environment with stray magnetic fields, a non-latching material design may be used as the external magnets are better able to control the polarization changes of light traveling within circulator core 302. This is true because the external magnets exert a much stronger magnetic field on the light than the stray magnetic influences. If designs using a latching material were placed in an environment containing stray magnetic fields, the stray magnetic fields may cause a polarization shift in the light traveling in circulator core 302. The present example shows a latching material design. A non-latching design is shown generally in FIG. 4.

Figure 5A:
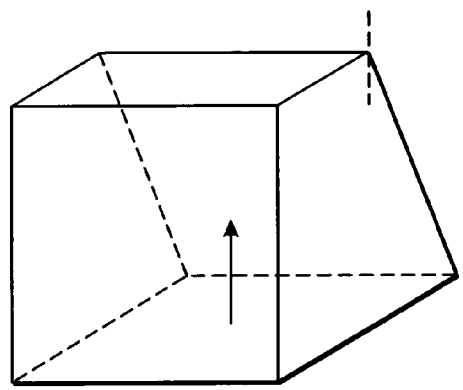
FIGS. 5A and 5B are perspective views of one embodiment of optical birefringent wedges used in the construction of the low-cost circulator
Figure 5B:
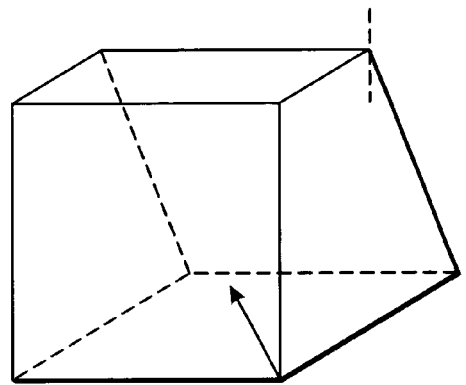
Figure 6A:
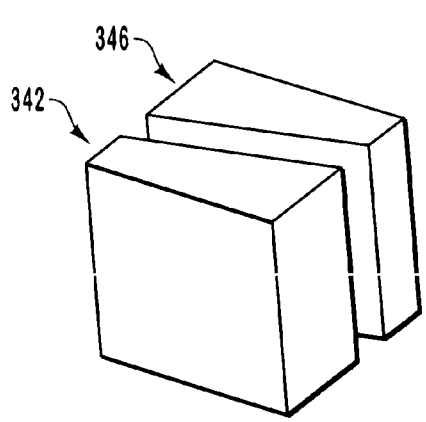
FIG. 6A is a perspective view of a Rochon prism.
Figure 6B:
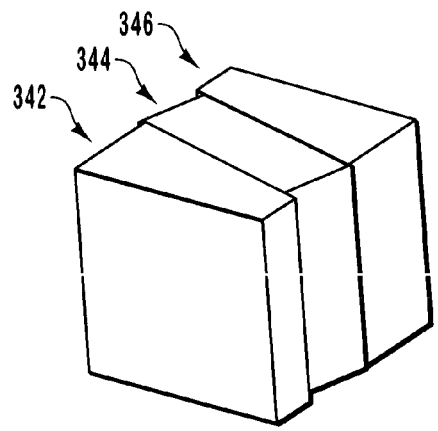
FIG. 6B is a perspective view of a core of an optical circulator having an assembly of wedges and a Faraday rotator according to another aspect of the present invention.

Following hereinafter is a discussion of the operation of circulator 300. To aid with the description, FIG. 3 includes ray traces 320, 322, 324, and 326 indicating the path that the optical signals may take as they propagate through circulator 300. In the transmission direction, a linearly polarized beam of electromagnetic radiation or light from transmit fiber 306, shown as trace 324, comes to optical core 302 through lens 340 that collimates the input optical signals. These collimated optical signals are transmitted into network fiber 310, as shown by trace 322. Depending on the orientation of the wedges 342, 346, the polarization direction of the electromagnetic radiation or light 324 may be either parallel or perpendicular to the optical axis of wedge 342. The wedges 342 and 346 used in circulator 300 are illustrated in FIGS. 5A and 5B. Putting these wedges 342 and 346 side by side creates a prism similar to the Rochon prism shown in FIG. 6A. To cause this prism to be optically non-reciprocal, a Faraday rotator 344 is inserted in between the two wedges 342, 346 as shown in FIG. 6B.

Because wedge 346 is birefringent, a beam passing through the wedge will usually be split into an ordinary (o) beam and an extraordinary (e) beam. An o beam typically travels through a birefringent material according to Snell's law dependant on one index of refraction of the birefringent material. The e beam on the other hand reacts to a second index of refraction and behaves differently than the o beam. In this case however, because the polarization direction of beam 324 is parallel to the optical axis, there is no o beam, and beam 324 acts as an e beam.

After traveling through Faraday rotator 344, the polarization direction of beam 324 is rotated by 45°, so that the polarization direction is perpendicular to the optical axis of wedge 342. As is true for a Rochon prism, the refractive indices encountered by the o and e beams as they pass through wedges 342 and 346 are different, such that optical core 302 bends beam 324 and it is then output as trace 322. The angle γ between traces 324 and 322, is described as follows:

$$\gamma = \arcsin[(n_o - n_e) \cdot \tan \theta] \quad (1)$$

where θ is the wedge angle, and $n_o$, $n_e$ are the refractive indices for the ordinary beam and the extraordinary beam in the two birefringent crystal wedges 342, 346. In the present case, the beam 324 acts like an o beam and is refracted such that it can be focused into the bi-directional communications fiber 310 via lens 330.

In the receiving direction the beam is transmitted from network fiber 310, as shown by trace 320, without any defined state of polarization. The receive beam generally does not have a well-defined state of polarization, because the receive beam is typically received after being transmitted through a lengthy segment of optical fiber. The beam passes through core 302, as shown by trace 326, and is directed into receive fiber 308. When trace 326 passes through the wedge 342, it will be slightly split into an e beam and an o beam. When these two beam components pass through Faraday rotator 344, both components will be rotated by 45°. When the two beam components enter wedge 346, where the optical axis is 45° apart from wedge 342, the e and o beams keep their refractive indices as in wedge 342, so that the wedges are complementary, the output beam 326 is bent almost parallel to trace 320 and can only enter fiber 308.

As can be appreciated by those skilled in the art, the optical axes of the respective wedges and the angle of rotation of the Faraday rotator may be other values than those in this example and still maintain the non-reciprocal transmission effects. For instance, the optical axis may be greater than about 0°, lesser or greater than 45°, or some other angle. So long as the wedges and Faraday rotator are chosen to function with the particular well maintained state of polarization of the transmit beam 324, whether it be some particular known angle or circularly polarized, the low cost optical core can be implemented Additionally, other optical components could be used in core 302 to achieve the desired optical results. These components may include other types of prisms, garnets, half wave plates and quarter wave plates optically tuned to the frequency of the light to be transmitted, and/or polarization beam splitters.

Figure 4:
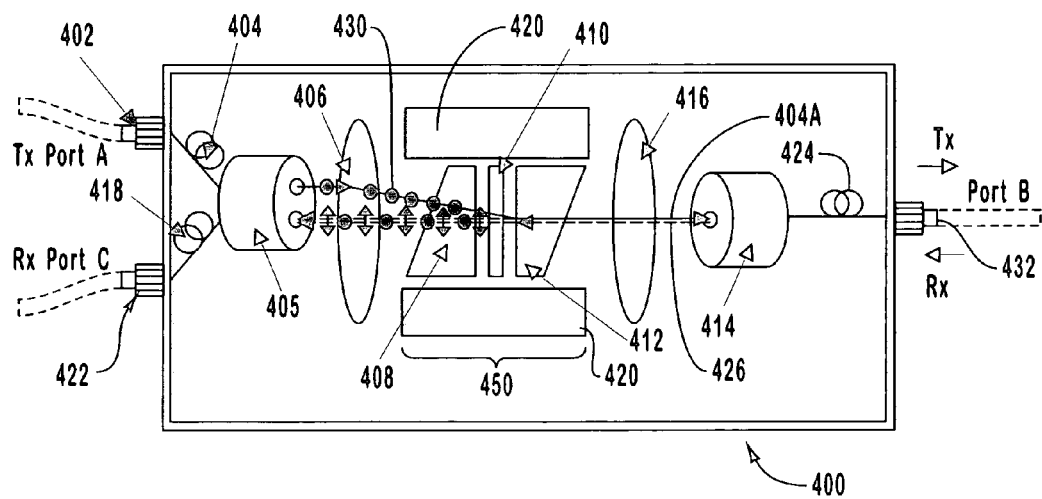
FIG. 4 is a schematic representation of an alternate portion of a plug-in module according to one aspect of the present invention.

Another example of an optical circulator 400 that may be used as a component in the present invention is illustrated in FIG. 4. The discussion with respect to circulator 300 is also applicable to circulator 400. As illustrated, circulator 400 includes an optical core 450 through which optical signals pass as they propagate from a transmit port 402 to a network port 432 and from network port 432 to receive port 422. It is understood that each port 402, 422 and 432 may include associated optical fibers and connectors between the optical fibers and circulator 400, as illustrated in dotted lines. For instance, standard form factor connectors, ferrules, and other types of optical connectors are contemplated and fall within the scope of the present invention.

Optical signals propagating through ports 402 and 422 may pass along one or more optical fibers 404, 418 disposed within a fiber pigtail 405. The pigtail 405 maintains optical fibers 404, 418 in the correct position relative to optical core 450 of circulator 400 so that the optical signals may propagate therethrough. Similarly, optical signals propagating through port 432 may pass along one or more optical fibers 424 disposed within a fiber pigtail 414 having a similar configuration to pigtail 405.

The optical core 450 of circulator 400 has a similar configuration to optical core 102 of circulator 300. To aid with explanation, an external magnet 420 is illustrated as at least partially surrounding optical wedges 408 and 412, and Faraday rotator 410. The magnet 420 creates the magnetic field that causes polarization shifts in the optical signals as they propagate through Faraday rotator 410 and non-latching optical wedges 408 and 412.

The angled surfaces of wedges 408 and 412 are disposed in close proximity to lenses 406 and 416. This is in contrast to circulator 300 where the angled surfaces of wedges 342 and 346 are disposed in close proximity to Faraday rotator 344 of FIG. 3. Although structurally different, both circulators 300 and 400 function in the same manner. For instance, in operation, a transmit light beam 430 is transmitted from transmit port 402. The light beam 430 then passes through PM fiber 404 disposed in a dual fiber pigtail 405, with a well maintained state of polarization (SOP). Alternatively, port 402 and PM fiber 404 may be a single mode (SM) connector and SM fiber, respectively.

The beam 430 passes through a collimating lens 406, where it is directed into and is bent by optical core 450, i.e., the assembly,of wedge 408, a magneto-optic material, such as the Faraday rotator fabricated from a YIG crystal (garnet) 410, and the wedge 412, The resultant beam 430 is focused into single fiber pigtail 414 by a lens 416, before propagating through network port 432 and associated optical fibers, illustrated by dotted lines.

Optionally and simultaneously, a second beam, called a receive beam 426, propagates in an opposite direction with respect to transmit beam 430. The receive beam 426 propagates along pigtail 414 and generally does not have a well-defined state of polarization, because receive beam 426 is typically received after being transmitted through a lengthy segment of optical fiber. The receive beam 426 is collimated by lens 416 and propagates through optical core 450, due to its direction of travel. This receive beam 426 is not deflected as transmit beam 430 is deflected. This receive beam 426, therefore, is focused into receive port 422 and associated optical fiber forming part of dual fiber pigtail 405.

Generally, the physical construction of a circulator such as the ones described above is accomplished by attaching discrete optical components onto a substrate material such as glass or polysilicon. The attachment can be accomplished by using epoxy or some other type of glue. Because the circulator uses birefringent crystal components, there is little loss. Therefore, a 1310 nanometer VCSEL can be used to generate the light pulses that represent the digital data. The invention, however, is not limited to the use of the 1310 nanometer VCSEL. Other types of lasers, such as a 1550 nanometer DFB, may be used, as well as other types of light generators.

It is understood that the communications module of the present invention may be practiced using any circulator with an internal structure capable of performing the required functions. Substantially any circulator design may be used that outputs light input from port A at port B and light input from port B at port C. In other words, the circulator need not be able to accept light input at port C. The circulators described herein require the input light from port A to be linearly polarized and the polarization direction to be aligned with the optical axis of the circulator core. Numerous other examples of particular structural components for a circulator for use in the present invention are disclosed in co-pending U.S. patent application Ser. No. 10/623,829, filed on Jul. 21, 2003, and entitled "Optical Circulator for Bi-Directional Communication", the contents of which were previously incorporated by reference in this application.

Following hereinafter is a discussion of various alternate embodiments of the optical core forming part of the circulator of the present invention, such as, but not limited to, circulators 300 and 400. The discussion specific to each optical core is also applicable to the discussion of other optical cores disclosed herein and otherwise identifiable in light of the teaching contained herein. While each embodiment discloses an optical core having specific optical components assembled in a defined manner, those skilled in the art will realize that other combinations of components may be used to achieve the same results within a particular embodiment. It is anticipated that all optical cores which achieve the objectives of the invention are contemplated herein. Specific core assemblies of polarization beam splitters, beam displacers, wedges, Faraday rotators, garnets, half-wave plates, quarter-wave plates, and mirrors that accomplish the objectives of the present invention are all contemplated and included herein.

Figure 7A:
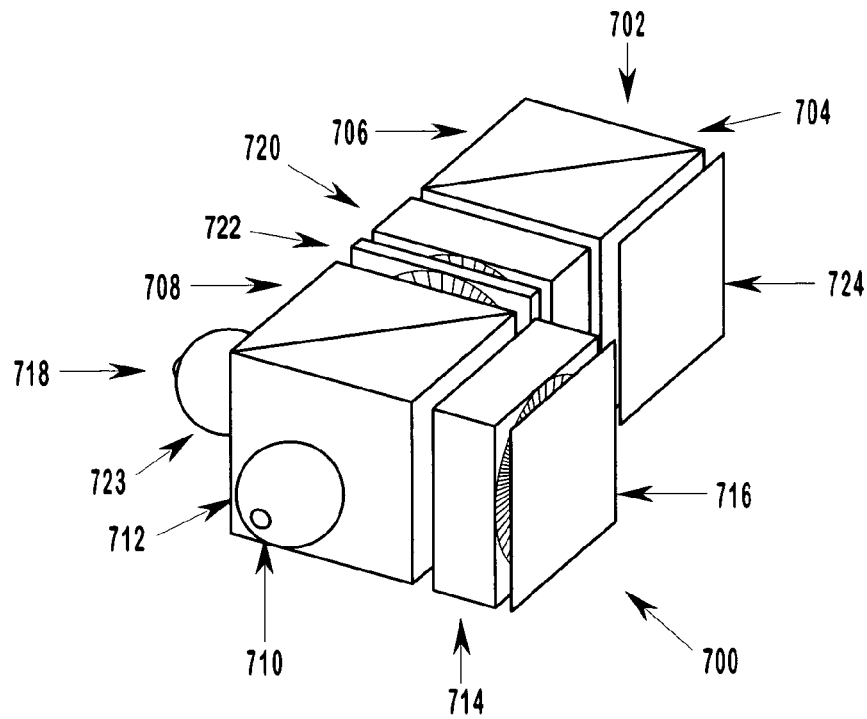
FIGS. 7A and 7B are schematic representations of an optical core of a circulator associated with the plug-in module of FIG. 2.
Figure 7B:
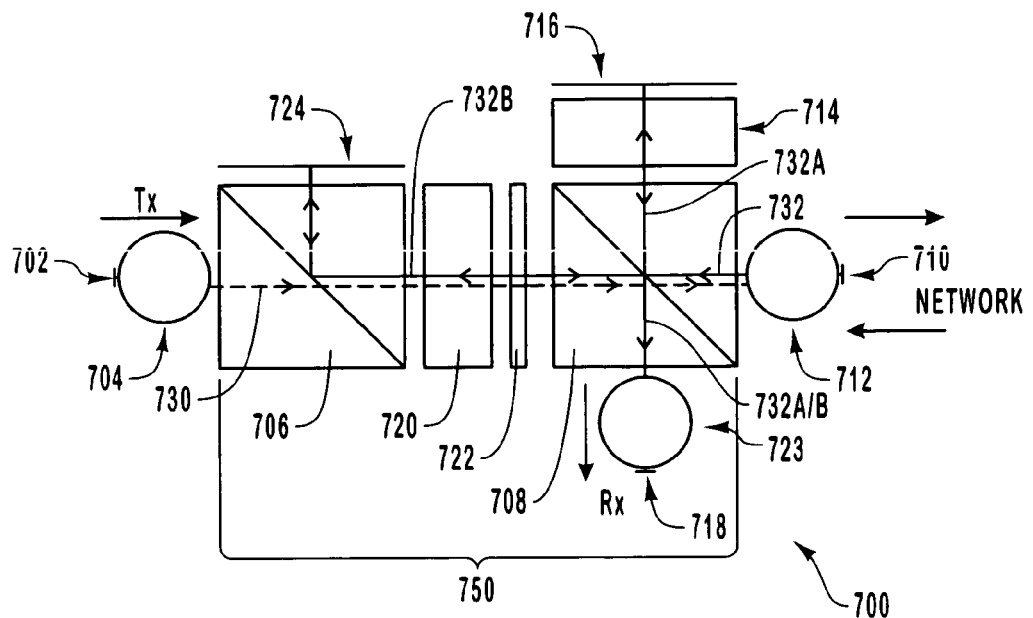

An alternate embodiment of an optical device according to the teaching of the present invention is illustrated in FIGS. 7A and 7B. With reference to FIG. 7A, the circulator 700 includes a laser diode 702 optically coupled to a first lens 704. This first lens 704 is optically coupled to an optical core 750 containing various optical components that reflect, refract, and/or change the polarization state of a beam passing therethrough. Also optically communicating with optical core 750 are a second lens 712 that optically communicates with a fiber 710 associated with the network node of circulator 700. Similarly, core 750 also optically communicates with a lens 723 that directs electromagnetic radiation received from the network node to a photodetector 718 associated with the receive node of circulator 700.

In this illustrated configuration the network node and the receive node are at the same end of circulator 700, while the transmit node is at another end of circulator 700. One skilled in the art will appreciate that the position of the network node, the receive node, and the transmit node may be varied. For instance, the network node may be disposed at the same end as the transmit node or the receive node may be disposed at the same end as the transmit node.

With reference to FIG. 7B, core 750 may include a first polarization beam splitter 706 optically coupled to first lens 704 and a garnet 720. Garnet 720 in turn is optically coupled to wave plate 722. The combination of garnet 720 and wave plate 722 may be termed a polarization shifting assembly since garnet 720 and wave plate 722, individually and collectively, may shift the polarization of electromagnetic radiation propagating therethrough. Various other optical components may be used to perform this function.

Wave plate 722 optically communicates with a second polarization beam splitter 708. Second polarization beam splitter 708 is optically coupled on a first side to lens 723, on a second side to lens 712, and on a third side to garnet 714. The garnet 714 is also optically coupled to mirror 716. The optical core 750 defined by the above elements functions similarly to the optical cores discussed previously. The functions of the various components of optical core 750 are discussed below.

In circulator 700, a light beam 730, depicted by dotted lines, from laser diode 702 of a transmitter portion of a transceiver, with a well-defined SOP, is collimated by lens 704. The light beam 730 from laser diode 702 enters core 750 through a first or transmit port of circulator 700. This first port accepts light with a well-maintained or defined SOP. By accepting light only with a well-defined SOP, the circulator function may be accomplished using a reduced number of components. In the configuration, because the SOP of the light is parallel, light beam 730 follows an optical path through polarizing beam splitter (PBS) 706 almost without reflection. The light beam 730, keeping the same SOP, continues its optical path through PBS 708 because garnet 720 and wave plate 722, such as, a half wave plate, each change the SOP of beam 730 by the same 45° angle, but in opposite directions. Finally, light beam 730 propagates into fiber 710 through lens 712 to complete its optical path to the second or network port of circulator 700. The fiber 710 optically couples to an optical network and allows light beam 730 to be transmitted onto the optical network.

In the backward optical path, a light beam 732 from optical fiber 710 traveling towards optical circulator 700 from the optical network is collimated by the lens 712 at the second port of circulator 700. The second port of circulator 700 transmits light in both forward and reverse directions, not matter the particular SOP of the light beams passing therethrough.

The light beam 732 is split into two beams, beam 732A and beam 732B with a orthogonal SOPs by PBS 708. These split beams follow different optical paths before being incident upon lens 723 and photodiode 718. The split beam with a vertical SOP, i.e., beam 732A, propagates along an optical path resulting in beam 732A being reflected by PBS 708. The vertical beam 732A then propagates through garnet 714 and is reflected back by mirror 716 so as to propagate through garnet 714 again. Its SOP is rotated by garnet 714 twice in the same direction so that the SOP is changed to horizontal and beam 732A passes through PBS 708 without reflection. Finally, beam 732A is focused onto photodiode 718 by lens 723. The photodiode 718 is often disposed on the receiver portion of a transceiver device. In any case, the outputs of light to the photodiode 718, or to some other device, represent the function typically performed by the third or receive port of a circulator.

The second split beam with a horizontal SOP, i.e., beam 732B, propagates along a different optical path through PBS 708. The SOP of second split beam 732B changes its SOP to vertical after it travels through wave plate 722 and garnet 720 because garnet 720 and wave plate 722 each rotate the SOP by 45° in same direction. The second split beam 732B is reflected by PBS 706 into mirror 724 and then reflected back. The beam 732B continues to propagate through garnet 720 and wave plate 722. The SOP remains vertical because garnet 720 and wave plate 722 each rotate the SOP by 45° but in opposite directions. Finally, second split beam 732B is reflected by PBS 708 and focused onto photodiode 718 or into the 2nd port of circulator 700 through lens 723.

It is understood that each port 702, 710 and 718 may include associated optical fibers and connectors between the optical fibers and circulator 700. For instance, standard form factor connectors, ferrules, and other types of optical connectors are contemplated and fall within the scope of the present invention. As with prior embodiments, it is also understood that alternate components that perform the same function may be substituted for the specific components of optical core 750. For instance, by way of example and not limitation, wave plates, garnets, and Faraday rotators may be configured and substituted for each other depending on the polarization rotation desired. Specific core assemblies of polarization beam splitters, beam displacers, wedges, Faraday rotators, garnets, half-wave plates, quarter-wave plates, and mirrors that accomplish the objectives of the present invention are all contemplated and included herein.

Figure 8A:
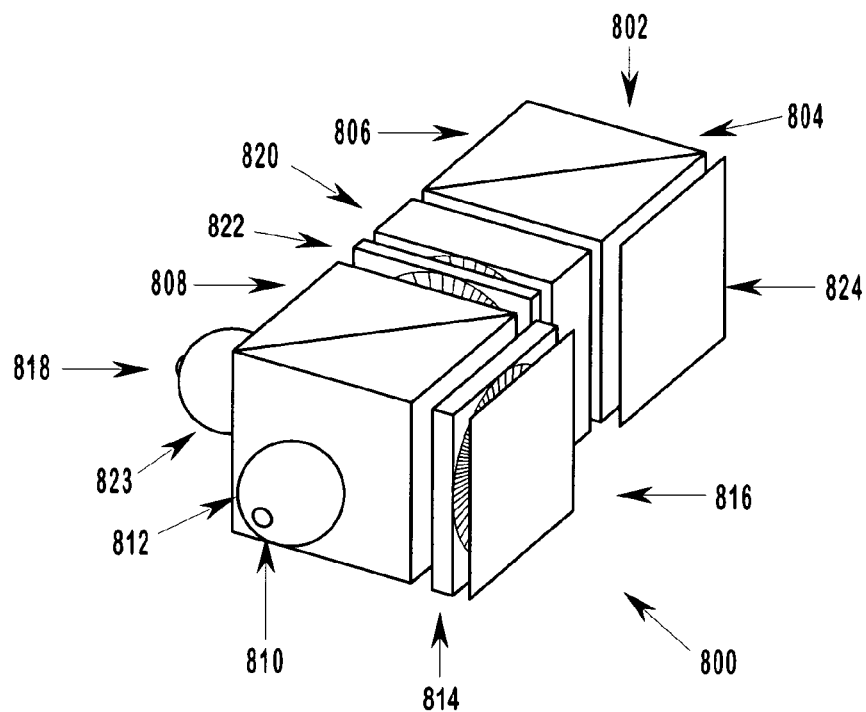
FIGS. 8A and 8B are schematic representations of an optical core of a circulator associated with the plug-in module of FIG. 2.
Figure 8B:
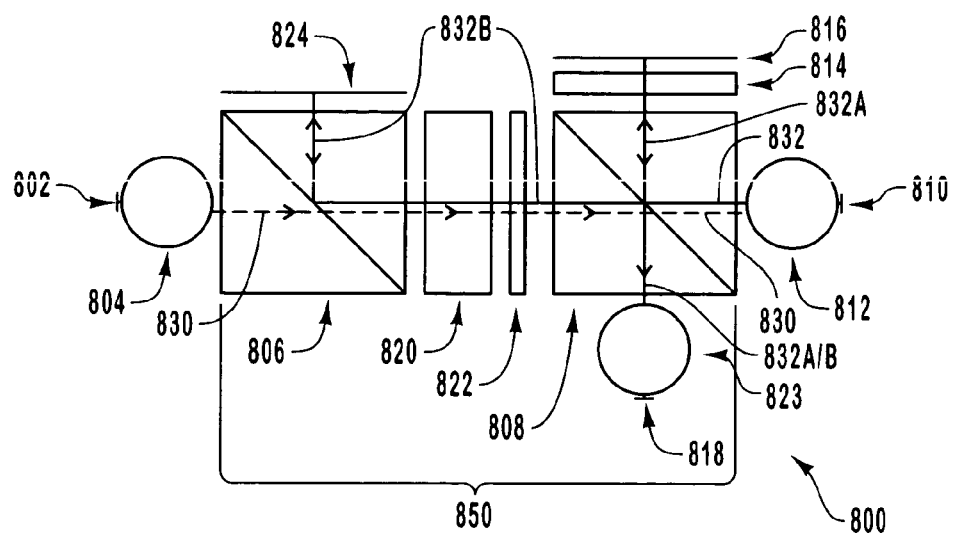

Another alternate embodiment of the optical device of the present invention is illustrated in FIGS. 8A and 8B. With reference to FIG. 8A, the circulator 800 includes a laser diode 802 optically coupled to a first lens 804. This first lens is optically coupled to an optical core 850 containing various optical components that reflect, refract, and/or change the polarization state of a beam passing therethrough. Also optically communicating with optical core 850 are a second lens 812 that optically communicates with a fiber 810 associated with the network node of circulator 800. Similarly, core 850 also optically communicates with a lens 823 that directs electromagnetic radiation received from the network node to a photodetector 818 associated with the receive node of circulator 800.

In this illustrated configuration the network node and the receive node are at the same end of circulator 800, while the transmit node is at another end of circulator 800. One skilled in the art will appreciate that the position of the network node, the receive node, and the transmit node may be varied. For instance, the network node may be disposed at the same end as the transmit node or the receive node may be disposed at the same end as the transmit node.

With reference to FIG. 8B, core 850 includes a first polarization beam splitter 806 optically coupled to the first lens 804 and a garnet 820. Garnet 820 is optically coupled to wave plate 822. The combination of garnet 820 and wave plate 822 may be termed a polarization shifting assembly since garnet 820 and wave plate 822, individually and collectively, may shift the polarization of electromagnetic radiation propagating therethrough. Various other optical components may be used to perform this function.

Wave plate 822 optically communicates with a second polarization beam splitter 808. Second polarization beam splitter 808 optically couples to lens 823 on a first side, to lens 812 on a second side, and a wave plate 814 on a third side. The wave plate 814 is also optically coupled to mirror 816. The optical core 850 functions similarly to the optical cores discussed previously. The functions of the various components of optical core 850 are discussed below.

In circulator 800, a light beam 830, depicted by dotted lines, from laser diode 802 with a well-defined SOP is input into the first port of circulator 800 and collimated by lens 804. In one example, because the SOP of the light is parallel, light beam 830 follows an optical path through PBS 806 almost without reflection. The light beam 830, keeping the same SOP, continues its optical path through PBS 808 because garnet 820 and wave plate 822, such as a half wave plate, each change the SOP of light beam 830 by the same angle, 45°, but in opposite directions. Finally, light beam 830 propagates into fiber 810 to complete its optical path to the second or network port of circulator 800. The fiber 810 optically coupled to an optical network and allows light beam 830 to be transmitted onto the optical network.

In the backward optical path, a light beam 832 travels through the optical fiber 810 at any SOP towards the circulator 800 and is collimated by the lens 812. The second port of circulator 800 transmits light in both forward and reverse directions, not matter the particular SOP of the light beams passing therethrough.

The light beam 832 is split into two beams, beam 832A and beam 832B with orthogonal SOPs by PBS 808. The split beams follow different optical paths before being incident upon lens 823 and photodiode 818. The split beam with a vertical SOP, i.e., beam 832A, propagates along an optical path resulting in beam 832A being reflected by PBS 808. The vertical beam 832A then propagates through wave plate 814, such as a quarter wave plate, and is reflected back by mirror 816 so as to propagate through wave plate 814 again. Its SOP is changed by wave plate 814 again such that the SOP is changed to horizontal, and beam 832A passes through PBS 808 without reflection. Finally, it is focused out of the third port of the circulator 800 and onto photodiode 818 in a transceiver by lens 823.

The second split beam with horizontal SOP, i.e., beam 832B propagates along a different optical path through PBS 808. The SOP of the second split beam 832B changes its SOP to vertical after it travels through garnet 820 and wave plate 822, such as a half wave plate, because garnet 820 and wave plate 822 each rotate the SOP by 45° in the same direction. The second split beam 832B is reflected by PBS 806 into mirror 824 where it is then reflected back. The light beam 832B continues to propagate through garnet 820 and wave plate 822. The SOP of light beam 832B is rotated by garnet 820 and wave plate 822 by 45° each, but in opposite directions, such that the SOP of the light beam 832B remains vertical after passing through garnet 820 and wave plate 822. Finally, second split beam 832B is reflected by the PBS 808 and focused out of the third port of the circulator 800 and onto the photodiode 818 through lens 823.

It is understood that each port 802, 810 and 818 may include associated optical fibers and connectors between the optical fibers and circulator 800. For instance, my standard form factor connectors, ferrules, and other types of optical connectors are contemplated and fall within the scope of the present invention. As with prior embodiments, it is also understood that alternate components that perform the same function may be substituted for the specific components of optical core 850. For instance, by way of example and not limitation, wave plates, garnets, and Faraday rotators may be configured and substituted for each other depending on the polarization rotation desired. Specific core assemblies of polarization beam splitters, beam displacers, wedges, Faraday rotators, garnets, half-wave plates, quarter-wave plates, and mirrors that accomplish the objectives of the present invention are all contemplated and included herein.

Figure 9A:
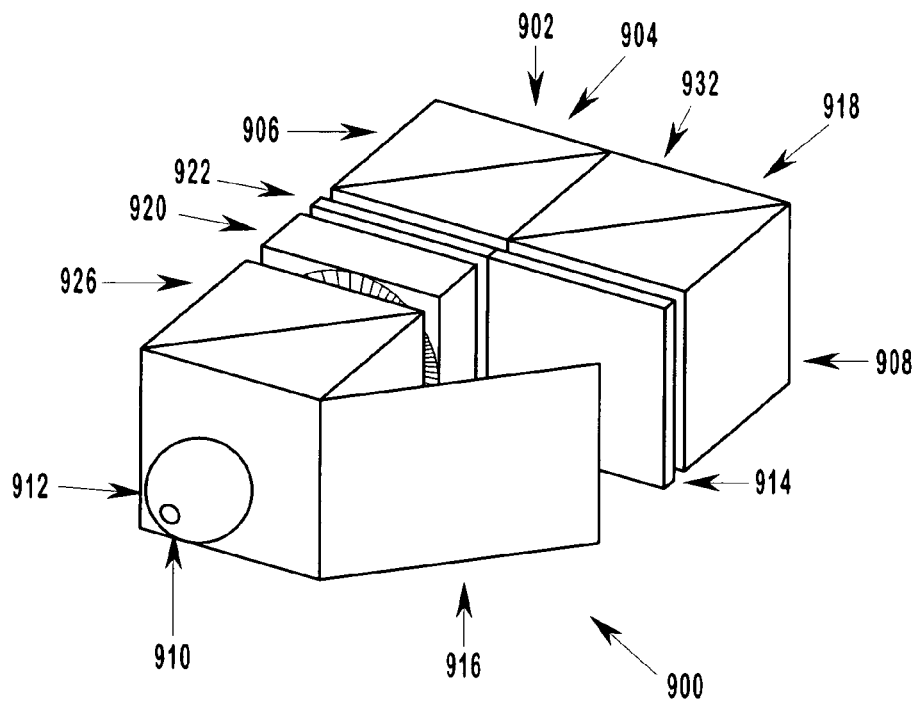
FIGS. 9A and 9B are schematic representations of an optical core of a circulator associated with the plug-in module of FIG. 2.
Figure 9B:
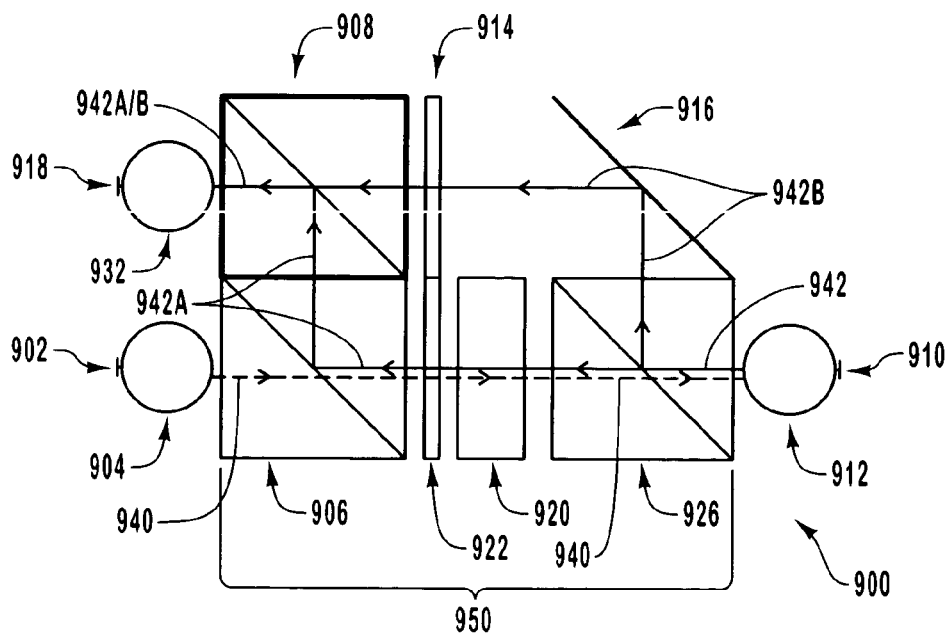

Yet another embodiment of the optical device of the present invention is illustrated in FIGS. 9A and 9B. With reference to FIG. 9A, the circulator 900 includes a laser diode 902 optically coupled to a first lens 904. This first lens 904 is optically coupled to an optical core 550 containing various optical components that reflect, refract, and/or change the polarization state of a beam passing therethrough. Also optically communicating with optical core 950 are a second lens 912 that optically communicates with a fiber 910 associated with the network node of circulator 900. Similarly, core 950 also optically communicates with a lens 523 that directs electromagnetic radiation received from the network node to a photodetector 918 associated with the receive node of circulator 900.

In this illustrated configuration the transmit node and the receive node are at the same end of circulator 900, while the network node is at another end of circulator 900. One skilled in the art will appreciate that the position of the network node, the receive node, and the transmit node may be varied. For instance, the network node may be disposed at the same end as the transmit node or the receive node may be disposed at the same end as the transmit node.

With reference to FIG. 9B, core 950 includes a first polarization beam splitter 906 optically coupled to the first lens 904 and, on a first side, to a wave plate 922, such as a half wave plate. First PBS 906 is optically coupled on a second side to second PBS 908, which is optically coupled to wave plate 914, such as a half wave plate. Wave plate 922 is optically coupled to a garnet 920, with the combination of wave plate 922 and garnet 920 being a polarization shifting assembly since garnet 920 and wave plate 922, individually and collectively, may shift the polarization of electromagnetic radiation propagating therethrough. Various other optical components may be used to perform this function.

Garnet 920 optically communicates with a third polarization beam splitter 926. Third polarization beam splitter 926 is coupled on a first side to lens 912 associated with the network node and on a second side to a mirror 916, the functions of which will be discussed in more detail hereinafter. The optical core 950 functions similarly to the optical cores discussed previously.

In core 950, light beam 940, depicted by dotted lines, propagates from laser diode 902 with well-defined SOP, for example horizontal, and follows an optical path into and through PBS 906 without reflection. Light beam 940 continues along the optical path by traveling through wave plate 922 and garnet 920. The garnet 920 and wave plate 922 rotate the polarization direction of light beam 940 from laser diode 902 each by 45°, but in opposite directions, so that the polarization direction remains horizontal after light beam 940 passes through garnet 920. The light beam 940 follows the optical path through PBS 926 without reflection and is focused by lens 912 to enter fiber 910. The fiber 910 optically couples to an optical network and allows light beam 930 to be transmitted onto the optical network.

In the backward optical path, a light beam 942 propagating from fiber 910 to photodiode 918 takes two different optical paths as PBS 926 splits light beam 942 into two different components, beam 942A with its associated path and beam 942B with its associated path. For the beam with a horizontal SOP, i.e., beam 942A, propagates along an optical path through PBS 926, garnet 920, and wave plate 922. Because of the propagation direction, garnet 920 and wave plate 922 will change the polarization direction each by 45° in the same direction. Therefore, the polarization direction of beam 942A will be changed from horizontal to vertical and light beam 942A will be reflected by PBS 906. The light beam 942A follows an optical path to PBS 908 where it is reflected to be incident upon photodiode 918.

In contrast, the beam with a vertical SOP, i.e., beam 942B, is reflected by PBS 926 following another optical path. This reflected beam is incident upon mirror 916 and reflected by mirror towards half wave plate 914. The polarization of beam 942B is changed by wave plate 914 so that its SOP is horizontal. This beam 942B then continues its optical path to photodiode 918 by passes through PBS 908 and lens 932.

It is understood that each port 902, 910 and 918 may include associated optical fibers and connectors between the optical fibers and circulator 900. For instance, standard form factor connectors, ferrules, and other types of optical connectors are contemplated and fall within the scope of the present invention. As with prior embodiments, it is also understood that alternate components that perform the same function may be substituted for the specific components of optical core 950. For instance, by way of example and not limitation, wave plates, garnets, and Faraday rotators may be configured and substituted for each other depending on the polarization rotation desired. Specific core assemblies of polarization beam splitters, beam displacers, wedges, Faraday rotators, garnets, half-wave plates, quarter-wave plates, and mirrors that accomplish the objectives of the present invention are all contemplated and included herein.

Figure 10A:
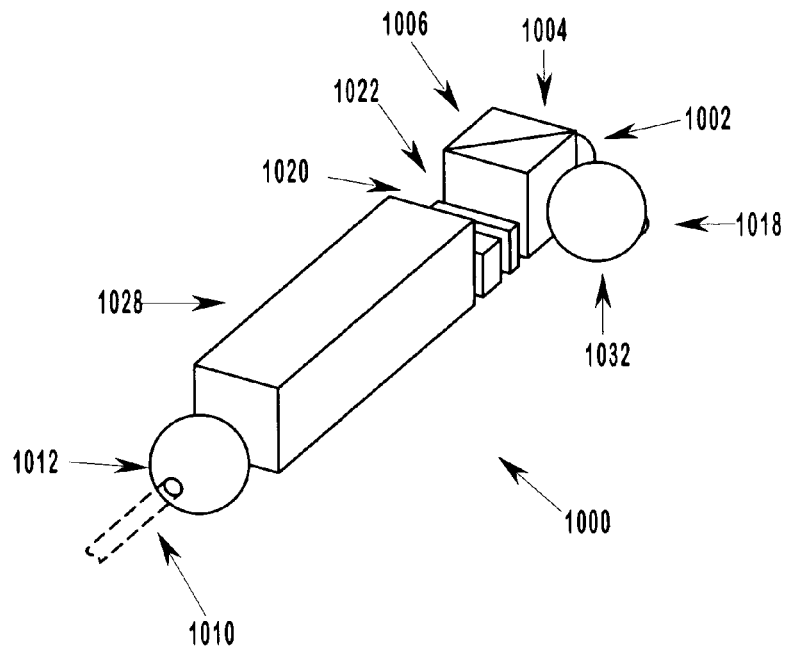
FIGS. 10A, 10B, 10C are schematic representations of an optical core of a circulator associated with the plug-in module of FIG. 2.
Figure 10B:
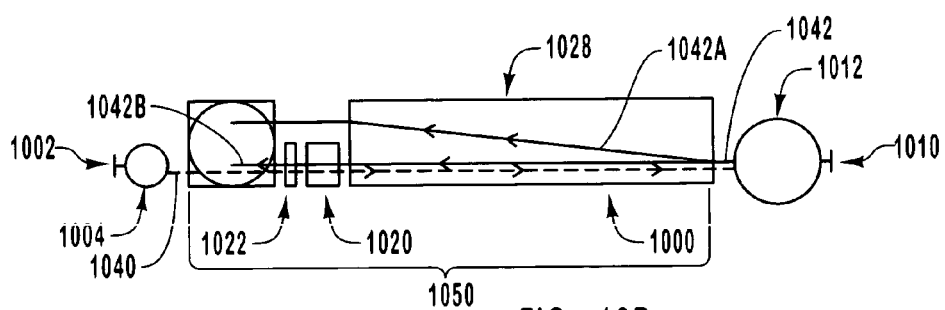
Figure 10C:
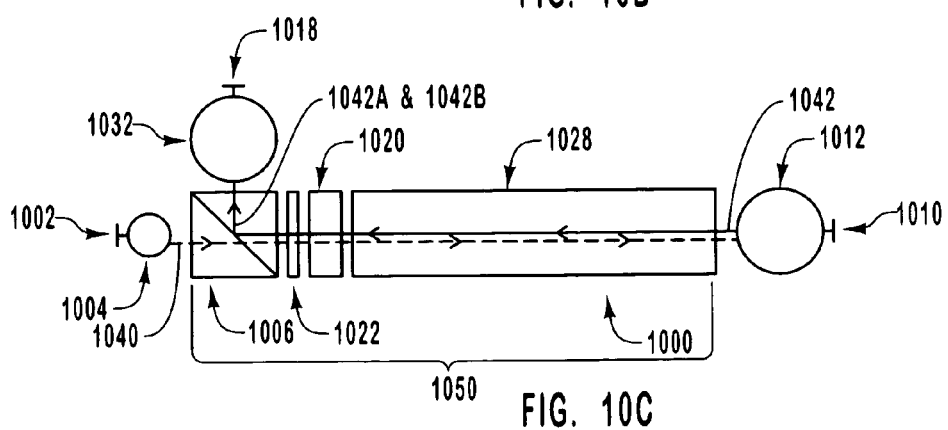

Another alternate embodiment of the optical device of the present invention is illustrated in FIGS. 10A–10C. With reference to FIG. 10A, the circulator 1000 includes a laser diode 1002 optically coupled to a first lens 1004. This first lens 1004 is optically coupled to an optical core 1050 containing various optical components that reflect, refract, and/or change the polarization state of a beam passing therethrough. Also optically communicating with optical core 1050 is a second lens 1012 that optically communicates with a fiber 1010, illustrated in dotted lines, associated with the network node of circulator 1000. Similarly, core 1050 also optically communicates with a lens 1023 that directs electromagnetic radiation received from the network node to a photodetector 1018 associated with the receive node of circulator 1000.

In this illustrated configuration the transmit node and the receive node are at the same end of circulator 1000, while the network node is at another end of circulator 1000. One skilled in the art will appreciate that the position of the network node, the receive node, and the transmit node may be varied. For instance, the network node may be disposed at the same end as the transmit node or the receive node may be disposed at the same end as the transmit node.

Core 1050 may include a first polarization beam splitter 1006 optically coupled on one end to first lens 1004 and optically coupled on another side to second lens 1032 which is connected to photo diode 1018 in the receive port. A portion of PBS 1006, such as a lower half of PBS 1006 optically couples to a wave plate 1022. The wave plate 1022 is in turn optically coupled to a garnet 1020, which optically communicates with a beam displacer 1028. The combination of garnet 1020 and wave plate 1022 may be termed a polarization shifting assembly since garnet 1020 and wave plate 1022, individually and collectively, may shift the polarization of electromagnetic radiation propagating therethrough. Various other optical components may be used to perform this function.

Another portion of PBS 1006, such as an upper portion thereof, optically couples to beam displacer 1028 without any intermediate optical components, such as, but not limited to, lenses, garnets, wave plates, etc. Beam displacer 1028 optically communicates with lens 1012 and network fiber 1010. The optical core 1050 is defined by PBS 1006, the polarization shifting assembly and beam displacer 1028. It may be understood that core 1050 may include various other optical components as desired by one skilled in the art in light of the teaching contained herein.

With reference to FIGS. 10B and 10C, laser diode 1002 creates a light beam 1040, illustrated in dotted lines. This light beam 1040 has a well defined, linear SOP, for example, horizontal, and follows an optical path through PBS 1006 without reflection. The light beam 1040 continues to follow the optical path through wave plate 1022 and garnet 1020. Because wave plate 1022 and garnet 1020 rotate the polarization direction each by 45°, but in opposite directions, light beam 1040 remains with a horizontal SOP. Light beam 1040 continues along the optical path through beam displacer 1028 that refracts or displaces incident beams based upon their SOP. For instance, beam displacer 1028 is designed such that a horizontally polarized beam performs as an o (ordinary) beam and a vertically polarized beam as an e (extraordinary) beam and is bent. Therefore, light beam 1040 from laser diode 1002 passes through beam displacer 1028 without being displaced and propagates directly into optical fiber 1010 through lens 1012.

In the reverse optical direction, a light beam 1042 from fiber 1010 is split by beam displacer 1028 into two beams with orthogonal SOPs; beam 1042A and beam 1042B. The beam with vertical polarization, i.e., beam 1042A from beam displacer 1028 is bent so that it is incident upon PBS 1006 along an optical path that circumvents or does not pass through garnet 1020 and wave plate 1022. PBS 1006 reflects beam 1042A toward lens 1032, which focuses beam 1042A on photodiode 1012.

In contrast, the beam with horizontal polarization, i.e., beam 1042B, follows an optical path garnet 1020 and wave plate 1022. This results in the SOP of beam 1042B being rotated by 90° because garnet 1020 and wave plate 1022 each rotate the polarization direction of the light by 45° in the same direction. Beam 1042B is then reflected by PBS 1006 and focused onto photodiode 1012 by lens 1032.

It is understood that each port 1002, 1012 and 1032 may include associated optical fibers and connectors between the optical fibers and circulator 1000. For instance, standard form factor connectors, ferrules, and other types of optical connectors are contemplated and fall within the scope of the present invention. As with prior embodiments, it is also understood that alternate components that perform the same function may be substituted for the specific components of optical core 1050. For instance, by way of example and not limitation, wave plates, garnets, and Faraday rotators may be configured and substituted for each other depending on the polarization rotation desired. Specific core assemblies of polarization beam splitters, beam displacers, wedges, Faraday rotators, garnets, half-wave plates, quarter-wave plates, and mirrors that accomplish the objectives of the present invention are all contemplated and included herein.

Figure 11A:
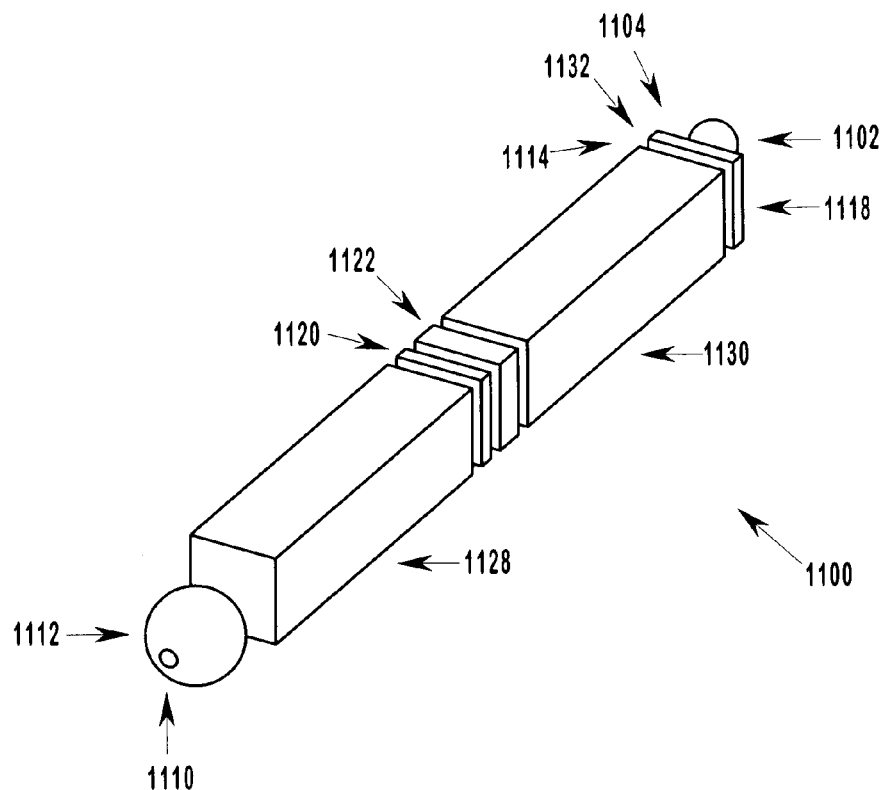
FIGS. 11A and 11B are schematic representations of an optical core of a circulator associated with the plug-in module of FIG. 2.
Figure 11B:
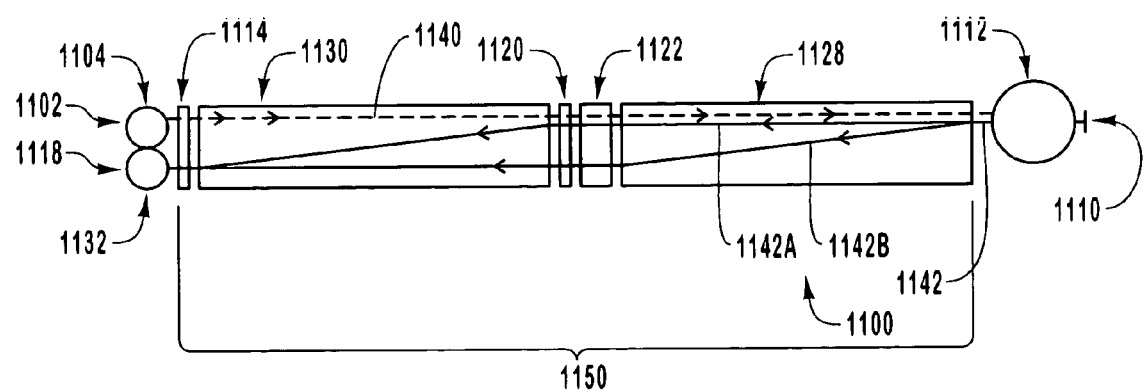

Yet another alternate embodiment of the optical device of the present invention is illustrated in FIGS. 11A and 11B. With reference to FIG. 11A, the circulator 1100 includes a laser diode 802 optically coupled to a first lens 804. As with other embodiments of the present invention, this first lens 804 is optically coupled to an optical core 850 containing various optical components that reflect, refract, and/or change the polarization state of a beam passing therethrough. Also optically communicating with optical core 850 is a second lens 812 that optically communicates with a fiber 810 associated with the network node of circulator 800. Similarly, core 850 also optically communicates with a lens 823 that directs electromagnetic radiation received from the network node to a photodetector 818 associated with the receive node of circulator 800.

In this illustrated configuration the transmit node and the receive node are at the same end of circulator 800, while the network node is at another end of circulator 800. One skilled in the art will appreciate that the position of the network node, the receive node, and the transmit node may be varied. For instance, the network node may be disposed at the same end as the transmit node or the receive node may be disposed at the same end as the transmit node.

With reference to FIG. 11B, core 1150 includes a first wave plate 1132 that optically couples to both first lens 1104, which is coupled to laser diode 1102, and second lens 1132 which is coupled to photo diode 1118. The opposite end of wave plate 1132 is optically coupled to a first beam displacer 1130 which is optically coupled in series to a second wave plate 1122, a garnet 1120, and a second beam displacer 1128, which is optically coupled to lens 1112 and network fiber 1110. This combination of wave plates, garnets and beam displacers is core 1150. Furthermore, the combination of garnet 1120 and wave plate 1122 may be termed a polarization shifting assembly since garnet 1120 and wave plate 1122, individually and collectively, may shift the polarization of electromagnetic radiation propagating therethrough. Various other optical components may be used to perform this function.

The light beam 1140, illustrated in dotted lines, from laser diode 1102 with a well defined polarization direction, for example horizontal, propagates through wave plate 1114, such as a half wave plate, which changes its SOP to vertical. By so doing, beam 1140 follows an optical path through beam displacer 1130, wave plate 1122, garnet 1120 and beam displacer 1128. The garnet 1120 and wave plate 1122 each change the SOP of beam 1140 by 45°, but in opposite directions such that the polarization direction remains vertical. The beam 1140 then propagates along the optical path to fiber 1110. If light beam 1140 from laser diode 1102 has a vertical SOP, wave plate 1114 may be eliminated from core 1150.

In the reverse optical direction, a light beam 1142 from fiber 1110 is split into two parallel beams after pass through beam displacer 1128. This occurs because beam 1142 does not have a well-defined SOP, but rather has components of various SOPs. The beams exiting from beam displacer 1128, beam 1142A and beam 1142B, have orthogonal SOPs, i.e., vertical and horizontal polarizations. Both beams 1142A and 1142B propagate along optical paths into the polarization shifting assembly where wave plate 1122 and garnet 1120, collectively, rotate their SOPs 90°. The beams 1142A and 1142B follow optical paths into beam displacer 1130 that combines them into a single beam with a shifted distance. The combined beam is then focused onto photodiode 1118 by lens 1132.

It is understood that each port 1102, 1112 and 1118 may include associated optical fibers and connectors between the optical fibers and circulator 1100. For instance, standard form factor connectors, ferrules, and other types of optical connectors are contemplated and fall within the scope of the present invention. As with prior embodiments, it is also understood that alternate components that perform the same function may be substituted for the specific components of optical core 1150. For instance, by way of example and not limitation, wave plates, garnets, and Faraday rotators may be configured and substituted for each other depending on the polarization rotation desired. Specific core assemblies of polarization beam splitters, beam displacers, wedges, Faraday rotators, garnets, half-wave plates, quarter-wave plates, and mirrors that accomplish the objectives of the present invention are all contemplated and included herein.

It is also understood by those skilled in the art that the above examples are provided for illustration purposes only. While several configurations are shown where the light is input at one end of the device and output at the other end, this need not be the case. Embodiments where the light beam is input and output on the same end of the circulator also fall within the scope of the invention. Indeed, the three ports may be located in any orientation on the core, provided the individual components of the optical core are designed to function as a circulator when transmitting the light signals. The invention allows for configurations of prisms, lenses and other optical components, arranged in such a way as to allow the input and output beams to come from any direction.

In addition to the above, it may be understood that optical equivalents may be substituted for one or more of the optical components described herein. For instance, and not by way of limitation to other substitutions, a half wavelength wave plate may be substituted by two quarter wavelength wave plates or other combination of waveplates having different fraction of wavelengths.

Additionally, one skilled in the art will appreciate that one or more of the optical components described herein may include one or more coatings or films to provide the polarization shifting properties or other optical properties. For instance, one or more of the optical components may include anti-reflection coatings, filter coatings, dichroic coatings, combinations thereof or other coatings that provide desired optical characteristics or properties.

Figure 12A:
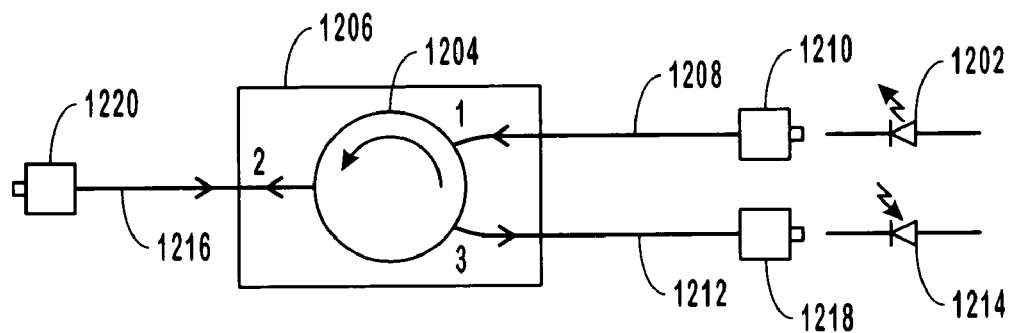
FIGS. 12A, 12B, and 12C are schematic representations of alternate embodiments of the plug-in module of FIG. 2.

Although the above examples have been illustrated in the context where a transceiver directly inputs light into the circulator from the laser diode and directly receives light from the circulator at the photodiode, other embodiments are contemplated as well. For example, as illustrated in FIG. 12A, in another exemplary embodiment of the present invention, light from a laser diode 1202 is transmitted to port 1 of a circulator 1204 optionally disposed in a pigtail module 1206, via a polarization maintaining or single mode fiber 1208 and polarization maintaining or single mode connector 1210 to maintain the well-defined polarization. The fiber 1208 may be disposed in a dual fiber pigtail where other fiber 1212 disposed in the pigtail is adapted to propagate received data from port 3 of circulator 1204 to a photo diode 1214. A network pigtail fiber 1216 is coupled to port 2 of circulator 1204 and adapted to couple to a fiber optic network. Each of pigtail fibers 1208, 1212, and 1216 may also have a connector 1210, 1218, and 1220 respectively attached to the free end of the fiber. The connectors may be of a standard form factor such as small form factor pluggable, Gigabit interface converter (GBIC), or any other standard form factor connector, such that the pigtails are usable with industry standard equipment.

Figure 12B:
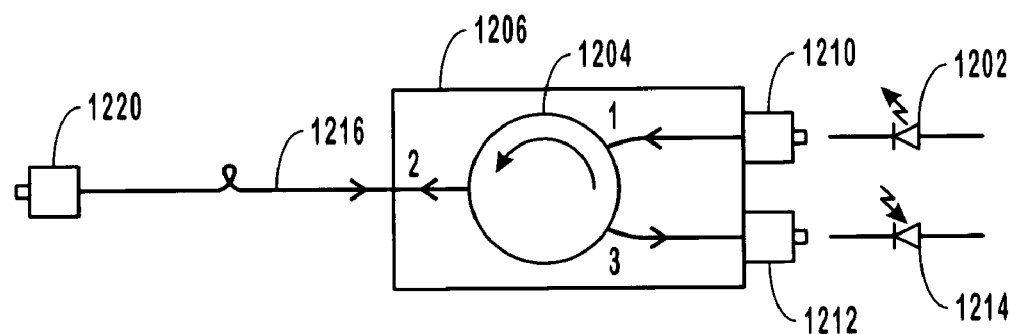

In another alternate embodiment of the present invention shown in FIG. 12B, which functions essentially as the device in FIG. 12A, a polarization maintaining or single mode connector 1210 is attached to the pigtail module 1206 and coupled to port 1 of the circulator 1204. Another connector 1212 is attached to the pigtail module 1206 and coupled to port 3 of the circulator 1204. The connectors 1210 and 1212 are arranged such that the pigtail module 1206 can be directly coupled into communications panels or boxes that are of standard form factors. A network pigtail fiber 1216 is coupled to port 2 of the circulator 1204. A standard form factor connector 1220 is coupled to the free end of the network pigtail fiber 1216.

Figure 12C:
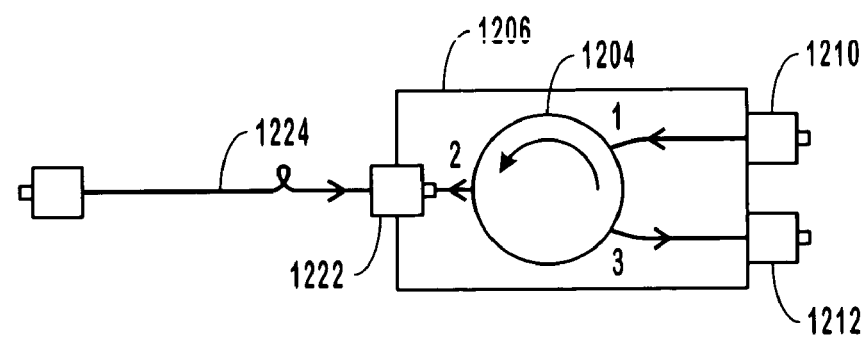

In yet another embodiment shown in FIG. 12C, that is similar to the embodiment of 5B, a receptacle 1222 is coupled to port 2 of the circulator 1204 instead of the network pigtail fiber 1216. This receptacle 1222 is arranged such that a standard form factor pigtail 1224 may be coupled to the receptacle 1222 and provides an interface to an optical network. Accordingly, the functionality of an optical circulator is realized. Using this functionality, bi-directional communication along a single fiber can be accomplished.

Figure 13:
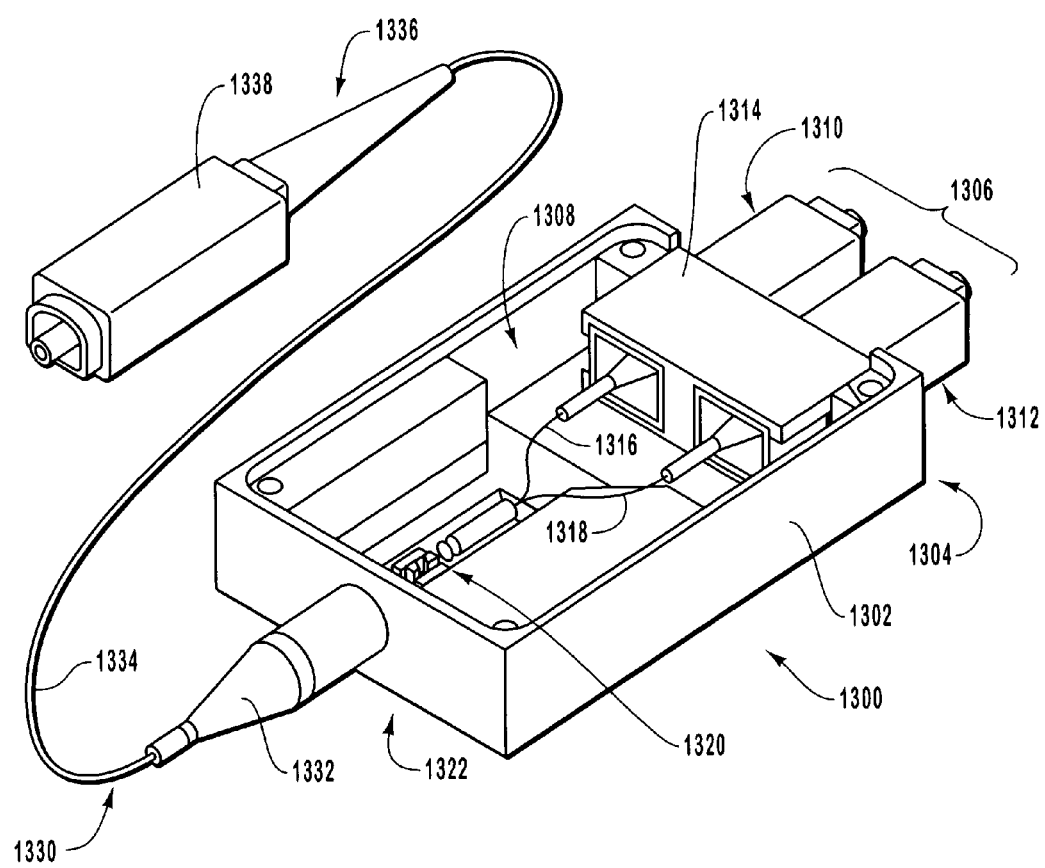
FIG. 13 shows an exemplary embodiment of the package integration of the plug-in module having a pigtail according to one aspect of the present invention.

FIG. 13 shows a mechanical design for an alternative embodiment of the plug-in module according to the present invention. The plug-in module 1300 includes a casing 1302 that supports and contains various optical components. A first end 1304 of casing 1302 includes a duplex plug 1306 having a first male connector 1310 and a second male connector 1312. The connectors 1310, 1312 may be any common type of connector or plug, such as small form factor connector, small form factor pluggable connector, a GBIC connector, or other connector that is adapted to couple with corresponding connectors of an optical transceiver module.

The duplex plug 1306 may be secured to casing 1302 by way of a mount 1314 such that a portion of each connector 1310 and 1312 extends into an interior portion 1308 of casing 1302. In this configuration, the ends of each connector 1310 and 1312 optically cooperating with optical fibers 1316 and 1318 which extend to circulator 1320. The circulator 1320 has the form of the circulators described herein or incorporated by reference. In this exemplary configuration, connector 1310 communicates with an input port of optical circulator 1320 and receives input from an optical transmitter (not shown). Connector 1312 communicates with a receive port of optical circulator 1320 and is used for receiving optical data from the network. The reverses may also be possible.

Optically communicating with, the opposite end of optical circulator 1320, ie., the network port or port communicating with the network is an optical pigtail 1330. A first end 1332 of optical pigtail is mounted to a second end 1322 of casing 1302, either fixably or releasably, so that it communicates with the network port of optical circulator 1320. Extending from first end 1332 of optical pigtail 1330 is a single optical fiber that both transmits and receives optical data from the network. Disposed upon second end 1336 of pigtail 1330 is a patch connector 1338 so that the module may be selectively coupled to patch panel 222 (FIG. 2). Alternatively, another connector may be mounted to second end 1336 of pigtail 1330.

It is understood by those of skill in the art that any type of standard form factor connector may be used in the plug-in module of the invention. It is further understood that the locations of the connectors on the plug-in modules may be varied. The connectors may be located on the front, back, sides, top or bottom of the plug-in module and still fall within the scope of the present invention.

Figure 14:
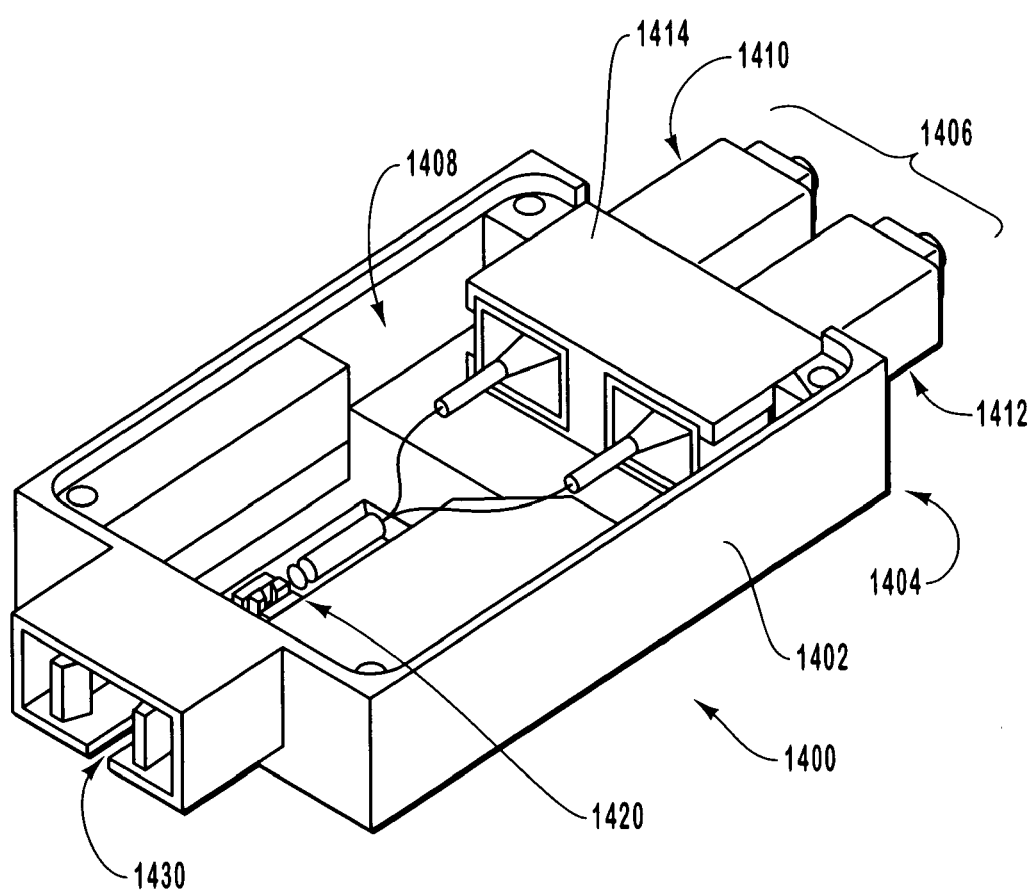
FIG. 14 shows an exemplary embodiment of the package integration of the plug-in module having a receptacle according to one aspect of the present invention.

FIG. 14 shows a mechanical design for an alternative embodiment of the plug-in module according to the present invention. The plug-in module 1400 includes a casing 1402 that supports and contains various optical components. A first end 1404 of casing 1402 includes a duplex plug 1406 having a first male connector 1410 and a second male connector 1412. The connectors 1410, 1412 may be any common type of connector or plug, such as small form factor connector, small form factor pluggable connector, a GBIC connector, or other connector that is adapted to couple with corresponding connectors of an optical transceiver module.

The duplex plug 1406 may be secured to casing 1402 by way of a mount 1414 such that a portion of each connector 1410 and 1412 extends into an interior portion 1408 of casing 1402. In this configuration, the ends of each connector 1410 and 1412 optically cooperating with optical fibers 1416 and 1418 which extend to circulator 1420. The circulator 1420 has the form of the circulators described herein or incorporated by reference. In this exemplary configuration, connector 1410 communicates with an input port of optical circulator 1420 and receives input from an optical transmitter (not shown). Connector 1412 communicates with a receive port of optical circulator 1420 and is used for receiving optical data from the network. The reverses may also be possible.

Formed at a second end 1422 of casing 1402 is a receptacle 1430. Receptacle 1430 optically communicates with the opposite end of optical circulator 1420, i.e., the network port or port communicating with the network is an optical pigtail 1430. The receptacle 1430 receives a connector lead, such as connector lead 218 (FIG. 2) that enables plug-in module 1400 to optically communicate with panel connector 220 (FIG. 2). Therefore, receptacle 1430 may have various configurations so long as it may mate with a connector lead used with module 1400. For instance, receptacle 1430 can accommodate a removable pigtail, small form factor pluggable, GBIC, or any other standard form factor connector. In the illustrated configuration, receptacle 1430 includes tongues 1432 that mate with complementary structures in connector lead 218 (FIG. 2) to fixably or releasbly couple connector lead 218 (FIG. 2) thereto. These tongues 1432 may be biased to close against connector lead 218 (FIG. 2).

Although the presently describe embodiment of module 1400 has receptacle 1430 disposed upon second end 1422, one skilled in the art will appreciate that receptacle 1430 may be located at other locations of module 1400. For instance, receptacle 1430 may disposed on the front, back, sides, top or bottom of the plug-in module and still fall within the scope of the present invention.

More generally, the present invention may be embodied in other specific forms without departing from its spirit or essential characteristics. The described embodiments are to be considered in all respects only as illustrative and not restrictive.

What is claimed is:

1. A communications module configured to selectively couple to a communications panel and a patch panel, the module comprising:
   a module casing having an interior portion;
   an optical circulator disposed within said interior portion, said optical circulator comprising:
      a first port through which optical data is transmitted;
      a second port through which optical data is received;
      a third port through which optical data is both transmitted and received;
      a plurality of polarization beam splitters optically coupled to at least one of the first second or third ports;
   at least one mirror for reflecting optical data;
   a plurality of garnets optically coupled to at least one of the first second or third ports; and
   at least one waveplate optically coupled to at least one of the first second or third ports; and
   duplex connector supported by said module casing and adapted to couple to the communications panel, said duplex connector comprising a first connector supported by said module casing and being adapted to optically communicate with said first port and a second connector supported by said module casing and being adapted to optically communicate with said second port.

2. The communications module as recited in claim 1, further comprising a receptacle coupled to at least one of the first second or third ports and adapted to receive a pigtail lead.

3. The communications module as recited in claim 1, further comprising a pigtail lead integrally formed with the communications module.

4. The communications module as recited in claim 1, wherein said first connector and said second connector are small form factor pluggable.

5. The communications module as recited in claim 1, wherein each of said first connector and said second connector is a gigabit interface converter.

6. A communications module comprising:
   a module casing having an interior portion;
   an optical circulator disposed within said interior portion, said optical circulator comprising:
      a first port through which optical data is transmitted;
      a second port through which optical data is received;
      a third port through which optical data is both transmitted and received;
      a first optical wedge optically coupled to said first port and said second port;
      a Faraday rotator optically coupled to said first wedge, said Faraday rotator rotating a polarization of a transmit signal and a receive signal passing therethrough;
      a second optical wedge optically coupled to said Faraday rotator and to said third port; and
      an external magnet at least partially surrounding the first optical wedge, the Faraday rotator, and the second optical wedge.

7. The communications module as recited in claim 1, wherein said first port is adapted to accept optical signals transmitted with a well maintained state of polarization.

8. The communications module as recited in claim 1, wherein said third port is adapted to receive optical signals transmitted with any state of polarization.

9. A plug-in communication module configured to selectively couple to a communication panel and a patch panel, the module comprising:
a duplex connector supported by a module casing and adapted to couple to the communication panel, said duplex connector comprising:
a first connector supported by said module casing and adapted to receive a transmit signal from the communication panel; and
a second connector supported by said module casing and adapted to transmit a receive signal to the communication panel;
a patch panel connector connected to said module casing, said patch panel connector carrying both optical signals transmitted from the communication panel and optical signals to be received by the communication panel; and
an optical circulator in optical communication with said duplex connector and said patch panel connector, said optical circulator comprising:
a first port through which optical data is only transmitted;
a second port through which optical data is only received;
a third port through which optical data is both transmitted and received;
a polarization beam splitter optically coded to at least one of the first second or third ports;
a waveplate optically coupled to the polarization beam splitter optically coupled to at least one of the first second or third ports;
a garnet optically coupled to the waveplate optically coupled to at least one of the first second or third ports; and
a beam displacer optically coupled to a the garnet optically coupled to at least one of the first second or third ports; and
wherein said optical circulator directs said transmit signal received at said first port to said third port and directs said receive signal received at said third port to said second port to enable bi-directional communication along a single optical fiber optically coupled to said third port of said circulator.

10. The communications module as recited in claim 9, wherein said first connector and said second connector are a small form factor pluggable connector.

11. The communications module as recited in claim 9, wherein said first connector and said second connector are a gigabit interface converter.

12. The communications module as recited in claim 9, wherein said patch panel connector is either fixably or removably connected to said module casing.

13. The communications module as recited in claim 9, wherein said first port is configured to accept optical signals transmitted with a well maintained state of polarization.

14. The communications module as recited in claim 9, wherein said third port is adapted to receive optical signals transmitted with any state of polarization.

15. The communications module configured to selectively couple to a communications panel, the module comprising:
a module casing;
a circular disposed in said module casing, the circulator comprising:
a first waveplate;
a first beam displacer optically coupled to the first waveplate;
a second waveplate optically coupled to the first beam displacer; and
a second beam displacer optically coupled to the second waveplate;
a first connector disposed on said module casing and coupled to a first port of the circulator, wherein said first port of said circulator is adapted to transmit optical data;
a second connector disposed on said module casing and coupled to a second port of said circulator, wherein said second port of said circulator is adapted to receive optical data, and wherein said first and second connectors are adapted to couple to the communications panel; and
a third connector coupled to a third port of said circulator, wherein said third port of said circulator is adapted to propagate bi-directional optical data through said third connector.

16. The communications module as recited in claim 15, wherein said first and second connectors are small form factor pluggable connectors.

17. The communications module as recited in claim 15, wherein said first and second connectors are gigabit interface converters.

18. The communications module as recited in claim 15, wherein said third connector is an integrally formed patch panel connector.

19. The communications module as recited in claim 18, wherein said patch panel connector further comprises an optical fiber attached to said module casing.

20. A communications module configured to selectively, couple to a communications panel, the module comprising:
a module casing;
a circulator disposed in said module casing, the circulator comprising:
a first wedge;
a second wedge; and
a garnet disposed between the first wedge and the second wedge;
a first connector disposed on said module casing and coupled to a first port of the circulator, wherein said first port of said circulator is adapted to transmit optical data;
a second connector disposed on said module casing and coupled to a second port of said circulator, wherein said second port of said circulator is adapted to receive optical data, and wherein said first and second connectors are adapted to couple to the communications panel; and
a third connector coupled to a third port of said circulator, wherein said third port of said circulator is adapted to propagate bi-directional optical data through said third connector.

21. The communications module as recited in claim 20, wherein said first and second connectors are small form factor pluggable connectors.

22. The communications module as recited in claim 20, wherein said first and second connectors are gigabit interface converters.

23. The communications module as recited in claim 20, wherein said third connector is an integrally formed patch panel connector.

24. The communications module as recited in claim 23, wherein said patch panel connector further comprises an optical fiber attached to said module casing.

25. The communications module as recited in claim 6, further comprising a receptacle coupled to at least one of the first second or third connectors and adapted to receive a pigtail lead.

26. The communications module as recited in claim 6, further comprising a pigtail lead integrally formed with the communications module.

27. The communications module as recited in claim 6, wherein said first connector and said second connector are small form factor pluggable.

28. The communications module as recited in claim 6, wherein each of said first connector and said second connector is a gigabit interface converter.

29. The communications module as recited in claim 6, wherein said first port is adapted to accept optical signals transmitted with a well maintained state of polarization.

30. The communications module as recited in claim 6, wherein said third port is adapted to receive optical signals transmitted with any state of polarization.

* * * * *

UNITED STATES PATENT AND TRADEMARK OFFICE
CERTIFICATE OF CORRECTION

PATENT NO.      : 7,031,574 B2
APPLICATION NO. : 10/624128
DATED           : April 18, 2006
INVENTOR(S)     : Huang et al.

It is certified that error appears in the above-identified patent and that said Letters Patent is hereby corrected as shown below:

Title Page
Item 75, Inventors, change "Robert IIuang" to --Robert Huang--

Drawings
Sheet 2, replace Figure 4 with the figure depicted herein below, in which the "PM fiber" previously labeled with "404A" has been relabeled with --404--

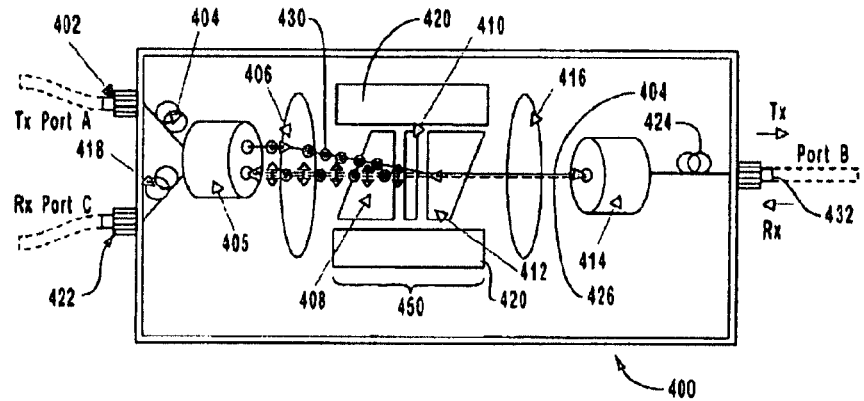

FIG. 4

Drawings
Sheet 8, replace Figure 11B with the figure depicted herein below, in which the "wave plate" previously labeled with "1120" has been labeled with --1122-- and the "garnet" previously labeled with "1122" has been relabeled with --1120--

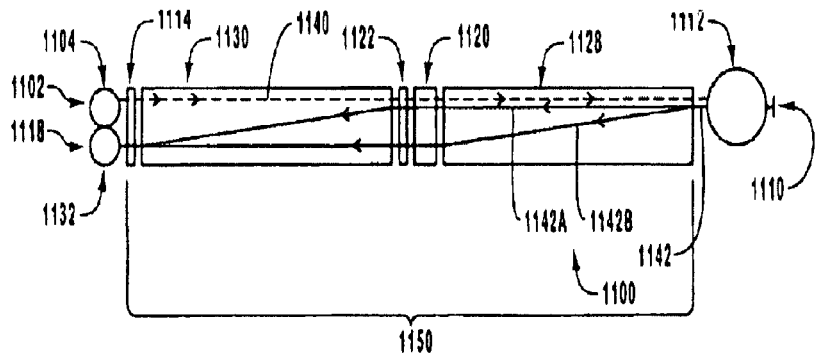

FIG. 11B

UNITED STATES PATENT AND TRADEMARK OFFICE
CERTIFICATE OF CORRECTION

PATENT NO. : 7,031,574 B2
APPLICATION NO. : 10/624128
DATED : April 18, 2006
INVENTOR(S) : Huang et al.

It is certified that error appears in the above-identified patent and that said Letters Patent is hereby corrected as shown below:

Drawings
Sheet 11, replace Figure 14 with the figure depicted herein below, in which the "second end" of "casing 1402" has been labeled with --1422-- and the "tongues" have been labeled with --1432--

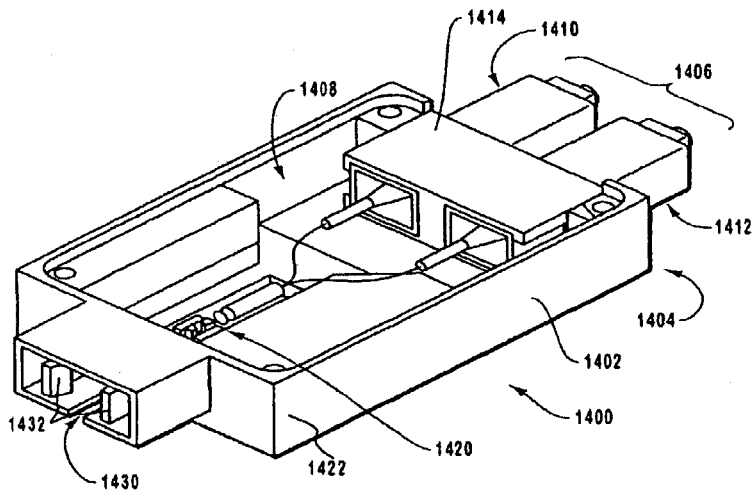

FIG. 14

Column 2
Line 45, after "fiber" remove "-"

Column 3
Line 43, change "configuration" to --configurations--
Line 45, change "includes" to --include--

Column 5
Line 30, change "receive:a" to --receive a--

Column 8
Line 61, change "102" to --302--

Column 9
Line 15, change "assembly,of" to --assembly of--

UNITED STATES PATENT AND TRADEMARK OFFICE
CERTIFICATE OF CORRECTION

PATENT NO. : 7,031,574 B2  
APPLICATION NO. : 10/624128  
DATED : April 18, 2006  
INVENTOR(S) : Huang et al.

It is certified that error appears in the above-identified patent and that said Letters Patent is hereby corrected as shown below:

Column 11
Line 10, change "not" to --no--
Line 13, remove "a"
Line 65, change "are" to --is--

Column 12
Line 48, change "not" to --no--

Column 13
Line 33, change "550" to --950--
Line 37, change "are" to --is--
Line 40, change "523" to --932--

Column 14
Line 22, change "For the" to --The--
Line 67, change "1023" to --1032--

Column 15
Line 62, change "1012" to --1018--
Line 64, after "optical path" insert --through--

Column 16
Line 2, change "1012" to --1018--
Line 3, change "1012 and 1032" to --1010 and 1018--
Line 22, change "802" to --1102--
Line 22, change "804" to --1104--
Line 24, change "804" to --1104--
Line 24, change "850" to --1150--
Line 28, change "850" to --1150--
Line 28, change "812" to --1112--
Line 29, change "810" to --1110--
Line 30, change "800" to --1100--
Line 30, change "850" to --1150--
Line 31, change "823" to --1132--
Line 32, change "818" to --1118--
Line 33, change "800" to --1100--
Line 35, change "800" to --1100--
Line 36, change "800" to --1100--
Line 43, change "1132" to --1114--
Line 46, change "1132" to --1114--

UNITED STATES PATENT AND TRADEMARK OFFICE
CERTIFICATE OF CORRECTION

PATENT NO. : 7,031,574 B2
APPLICATION NO. : 10/624128
DATED : April 18, 2006
INVENTOR(S) : Huang et al.

It is certified that error appears in the above-identified patent and that said Letters Patent is hereby corrected as shown below:

Column 17
Line 5, change "pass" to --passing--
Line 18, change "1112" to --1110--
Line 54, change "fraction" to --fractions--

Column 18
Line 33, change "5B" to --FIG. 12B--
Line 56, change "cooperating" to --cooperate--
Line 66, after "with" remove ","

Column 19
Line 34, Line 56, change "cooperating" to --cooperate--
Line 58, change "releasbly" to --releasably--

Column 20
Line 18, after "first" insert --,--
Line 22, after "first" insert --,--
Line 24, after "first" insert --,--
Line 35, after "first" insert --,--

Column 21
Line 30, after "first" insert --,--
Line 32, after "first" insert --,--
Line 35, after "first" insert --,--
Line 37, after "coupled to" remove "a"
Line 38, after "first" insert --,--

UNITED STATES PATENT AND TRADEMARK OFFICE
CERTIFICATE OF CORRECTION

PATENT NO. : 7,031,574 B2
APPLICATION NO. : 10/624128
DATED : April 18, 2006
INVENTOR(S) : Huang et al.

It is certified that error appears in the above-identified patent and that said Letters Patent is hereby corrected as shown below:

<u>Column 23</u>
Line 3, after "first" insert --,--

Signed and Sealed this

Second Day of September, 2008

JON W. DUDAS
*Director of the United States Patent and Trademark Office*